United States Patent [19]
Okada et al.

[11] Patent Number: 5,458,460
[45] Date of Patent: Oct. 17, 1995

[54] DRAINAGE PUMP AND A HYDRAULIC TURBINE INCORPORATING A BEARING MEMBER, AND A METHOD OF MANUFACTURING THE BEARING MEMBER

[75] Inventors: Ryoji Okada, Ibaraki; Kooji Aizawa, Hitachi; Masayuki Yamada; Kenji Otani, both of Tsuchiura; Kunio Takada, Ibaraki; Mitsuaki Haneda, Ibaraki; Toshihiro Yamada, Ibaraki, all of Japan

[73] Assignee: Hitachi, Ltd., Tokyo, Japan

[21] Appl. No.: 197,312

[22] Filed: Feb. 16, 1994

Related U.S. Application Data

[62] Division of Ser. No. 34,379, Mar. 18, 1993.

[51] Int. Cl.⁶ .................................................. F04D 29/04
[52] U.S. Cl. ...................... 415/229; 384/297; 384/907.1
[58] Field of Search ............................... 415/229, 170.1; 384/276, 297, 625, 907.1, 913

[56] References Cited

U.S. PATENT DOCUMENTS

| | | | |
|---|---|---|---|
| 2,297,001 | 9/1942 | Bour | 415/170.1 |
| 3,936,295 | 2/1976 | Cromwell et al. | |
| 4,029,368 | 6/1977 | Tschirky et al. | 415/170.1 |
| 4,126,360 | 11/1978 | Miller et al. | 415/170.1 |
| 4,317,850 | 3/1982 | Verburgh et al. | |
| 4,848,934 | 7/1989 | Blakely et al. | 384/297 |
| 4,892,419 | 1/1990 | Inoue et al. | |
| 4,912,835 | 4/1990 | Harada et al. | |
| 4,989,306 | 2/1991 | Leino et al. | |
| 4,997,324 | 3/1991 | Shirai et al. | |
| 5,346,316 | 9/1994 | Okada et al. | 384/297 |

FOREIGN PATENT DOCUMENTS

| | | |
|---|---|---|
| 3435821 | 9/1984 | Germany . |
| 3733117 | 9/1987 | Germany . |
| 8915546.7 | 8/1989 | Germany . |
| 4-325778 | 11/1992 | Japan ..... 415/229 |
| 5-99195 | 4/1993 | Japan ..... 415/229 |
| 6-17790 | 1/1994 | Japan ..... 415/229 |

OTHER PUBLICATIONS

Database WPI Week 8024 Derwent Publications Ltd., London, GB; An 80–42300c & JP–A–55 058 360 (Satohsen K.K.) 2 May 1980 *Abstract*.
Patent Abstracts of Japan, vol. 15, No. 197 (C–833) 21 May 1991 & JP–A–03 053 055 (Kobe Steel Ltd.) 7 Mar. 1991 *Abstract*.
Patent Abstract of Japan, vol. 12, No. 386 (M–754) 14 Oct. 1988 & JP–A–63 139 724 (Teijin Ltd) 11 Jun. 1988 *Abstract*.
Patent Abstracts of Japan, vol. 8, No. 168 (C–236) 3 Aug. 1984 & JP–A–59 067 363 (Tsukamoto Seiki K.K.) 17 Apr. 1984 *Abstract*.

*Primary Examiner*—Edward K. Look
*Assistant Examiner*—Mark Sgantzos
*Attorney, Agent, or Firm*—Antonelli, Terry, Stout & Kraus

[57] ABSTRACT

Disclosed is a bearing unit which can be used in a drainage pump operated without supply of clean water or a hydraulic pump, which exhibits excellent wear resistance against water containing earth and sand and satisfactory assembling facility, and a method of manufacturing the bearing unit.

The contact surface of a bearing made of stainless steel and/or that of a sleeve is applied with a sprayed coating, the main component of which is WC, and which contains one or more elements selected from a group consisting of nickel, chromium and cobalt as a binder material thereof, or a sprayed coating, the main component of which is $Cr_3C_2$, and which contains NiCr as a binder material, after the sprayed coating has been formed, heating at from 300° C. to 550° C. is performed for one hour or longer so that hardness and wear resistance equivalent to those of a WC-12% sintered article is attained.

23 Claims, 14 Drawing Sheets

DRAINAGE PUMP AND A HYDRAULIC TURBINE INCORPORATING A BEARING MEMBER, AND A METHOD OF MANUFACTURING THE BEARING MEMBER

This is a division of application Ser. No. 034,379 filed Mar. 18, 1993.

BACKGROUND OF THE INVENTION

1. Field of the Invention

The present invention relates to a drainage pump and, a hydraulic turbine, and more particularly to a bearing unit exhibiting excellent wear resistance, satisfactory reliability and assembling facility, with the bearing unit being adapted to be utilized in a pump of a type adapted to be operated absent a clear water supply to the bearing portion thereof or a hydraulic turbine, and relates to a drainage pump and a hydraulic turbine each incorporating the bearing unit as well as a method for manufacturing the bearing unit.

2. Description of Related Art

Since substantially all precipitation flows in the drainage ditches due to the recent urbanization, the precipitation cannot be completely drained off and there is a tendency for municipal floods causing roads to be under water. Hence, drainage facilities, each provided with a drainage pump system have been established, causing another problem that the cost of operation and maintenance increases. Therefore, an automatic operation drainage pump system has been examined. The drainage pump system of this type must improve the performance and reliability thereof and non-water-supply operation technology. In order to achieve this, an increase capacity and precedent-standby operation have been studied.

The non-water-supply operation technology is to operate the drain pump while supplying no water to the space between a sleeve on a shaft and a bearing. Since no clear water supply apparatus is provided, a malfunction does not take place due to a failure of the clear water supply apparatus and that of a clear water supply sensor, resulting in satisfactory reliability. In order to enable the non-water-supply operation to be performed, a bearing unit must not be worn even if earth and sand contained in the drain invade thereto.

A conventional bearing unit adapted to the non-water-supply technology has been constituted by a sleeve (a sintered article) made of tungsten carbide (hereinafter "WC") exhibiting excellent wear resistance and corrosion resistance and by a ceramic bearing (a sintered article). Constructions fashioned of a sleeve made of WC and the ceramic bearing have been disclosed in JP-A-60-81517 and JP-A-60-88215.

The enlargement of the pump capacity inevitably requires the diameter of the bearing thereof to be enlarged. However, the conventional bearing unit fashioned of a WC sleeve and the ceramic bearing require a large-diameter sintered sleeve and a sintered bearing. However, a problem arises in that the sintering technology cannot meet the requirements and the weight of the parts cannot be reduced, resulting in the assembling of the bearing unit. Therefore, a hard film coating technology capable of coating a film having hardness equivalent to that of ceramics has been investigated. It is noted that a non-water supply drainage pump using a sleeve applied with a sprayed WC coating and a ceramic bearing has been disclosed, for example, in "Trybologist", No. 2, vol. 36, pp. 144 to 147.

Also the bearing for a hydraulic turbine must have wear resistance against water including sediment. Therefore, a conventional bearing for a hydraulic turbine has been made of ceramics such as silicon carbide (SIC).

As a general rule, a sprayed coating is used as the hard film for the bearing portion of a drain pump. However, the fact that the sprayed coating is inferior to a sintered article having the same composition in terms of the hardness and the strength causes an investigation for improving the hardness and the strength of the sprayed coating to be made. For example, technology for improving the adhesive strength and the strength by plasma-spraying a material composed of, by weight, 50% chromium and 50% nickel and by holding the sprayed coating at from about 700° C. to 800° C. for from about 1 to 100 hours has been disclosed in JP-A-57-2872. Another technology has been disclosed in JP-A-60-149762 which is capable of strengthening the sprayed coating by forming a 20 to 80 wt % Ni—Cr sprayed coating, the main component of which is Ni—P on a ferrous material, and by subjecting them to a heat treatment set to from about 600° C. to 1000° C.

Since the hydraulic turbine has a large diameter, the conventional structure has an arrangement that sectioned ceramics are disposed. Therefore, there has been a desire of using the hard film similarly to the bearing for a drain pump. A bearing unit for a hydraulic turbine that uses a sprayed WC coating and chromium carbide ($Cr_3C_2$) has been disclosed on pp. from 80 to 85, in resumes of the twenty-sixth lecture meeting titled "Turbo Machines", May 1991.

The precedent standby operation is an idle operation executed before commencement of drainage in a state where the water level is lower than the level at which the drainage operation can be performed. By performing the precedent standby operation, full power operation can be performed when the water level rises to a level at which the drainage can be performed. Therefore, a rapid increase in precipitation can be quickly accomodated with the subject system. However, the fact that the bearing must be idly performed without drain to be introduced into the sliding or bearing portion thereof for a short time causes the friction coefficient between the bearing and the sleeve must be extremely low so as to be freed from being damaged during the foregoing dry operation.

A bearing capable of performing both of a long time precedent standby operation, in which the idle operation is carried out for a long time, and the non-water-supply operation has not been developed yet. However, a method capable of supplying external water to the sliding portion of the bearing at the time of the idle operation has been proposed in JP-A-55-90718.

In order to drain water containing earth and sand, the bearing must have satisfactory wear resistance. In particular, the non-water supply bearing must have wear resistance against slurry because clear water for protecting the bearing and the sleeves is not supplied. The major portion of the earth and sand is composed of feldspar and quartz. Therefore, earth and sand have a maximum hardness of about Vickers (Hv)1000 (which is the hardness of quartz). Accordingly, the hardness required for the bearing and the sleeve is Hv 1000 or higher.

A sintered article composed one of WC, SiC and silicon nitride ($Si_3N_4$) is excellent in the hardness while providing satisfactory wear resistance because these materials have a hardness of Hv 1000 or higher, that is, WC has a hardness of about Hv 1400, SiC has a hardness of about Hv 2800 and Si3N4 has a hardness of about Hv 1600. However, the sintering technology, the assembling facility and the manufacturing cost cause a limit to present in the size of the sleeve and the bearing that are fully made of a sintered material composed of WC, SiC or $Si_3N_4$. Therefore, there has been investigated the use of a hard film in place of the aforesaid sintered article. Since the film thickness must be several hundreds microns if the quantity of wear is taken into consideration, there is a limit in the method of manufacturing the hard film. As the hard film for the bearing portion of a drainage pump, a thermally-sprayed coating mainly composed of WC or $Cr_3C_2$ and having a thickness of from about 100 to 200 μm has been widely used because a relatively thick film and satisfactory hardness can be obtained. However, the sprayed coating mainly composed of WC or $Cr_3C_2$ generally has unsatisfactory hardness as compared with a sintered article although depending upon the material, the forming method and conditions, with the aforesaid sprayed coating has a hardness of from about 600 Hv to 1000.

The relationship between a variety of conventional sprayed coatings and the wear resistance against water containing earth and sand will be described with reference to FIG. 21 which is a graph showing the wear rates measured by element experiments to be described later in the description about preferred embodiments. Each one of the sprayed coatings were formed on a stainless steel plate to serve as a rotary side specimen, while α-SiC was employed to serve as the stationary side specimen. The residual conditions were as follows: the surface pressure was 2 kg/cm$^2$, the peripheral speed was 0.5 m/sec, the concentration of silica particles in earth and sand in water was 9 wt %. It is noted that the detailed shape of the specimen and the sliding method and the like were the same as those of the experimental conditions shown in FIG. 19 with regard to the preferred embodiments.

The abscissa of a graph shown in FIG. 21 stands for cross-sectional Vickers hardness of the sprayed coatings, and the ordinate stands for relative wear ratio standardized while making the wear ratio of WC-12% cobalt sintered article to be a reference. Sprayed coatings 1, 2 and 3 were conventional sprayed coatings formed by a high speed spraying method and a detonation spraying method and mainly composed of WC or $Cr_3C_2$. As shown in FIG. 21, the wear resistance against water containing earth and sand considerably depends upon the hardness of the sprayed coating. It is preferred that a satisfactory effect can be obtained if the hardness is Hv 1000 or higher as described above. As can be understood from from FIG. 21, the conventional sprayed coating cannot provide satisfactory hardness and wear resistance against water containing earth and sand.

In general, spraying is an operation in which not only hard particles such as WC or $Cr_3C_2$ are heated and sprayed but also metal particles such as nickel, chromium or cobalt particles are mixed and simultaneously heated and sprayed. As a result, WC particles or $Cr_3C_2$ particles are bound by molten metal of nickel, chromium or cobalt to form a film. The reason why the sprayed coating is lower in hardness than that of the sintered article is not that the WC or $Cr_3C_2$ particles are not of a lower hardness but that the binder metal for binding the WC or $Cr_3C_2$ particles has defects such as blow holes or that the binding strength between the binder metal and the WC or $Cr_3C_2$ particles is not fully high.

In order to enlarge the binding strength between WC or $Cr_3C_2$ particles, there have been various proposals for providing and improved spraying method. For example, a high speed flame spraying method has been proposed for increasing the spraying velocity of the particles by utilizing the combustion energy of a combustible gas and a detonation spraying method utilizing a detonation of a combustible gas. As a result, the particle velocity at the time of spraying can be increased as compared with the speed realized when the conventional plasma sprayed coating is formed, resulting in a sprayed coating of higher hardness. However, the wear resistance against sediment water containing earth and sand is insufficient even if the sprayed coating is formed by any of the aforesaid spraying methods. As understood from the element test shown in FIG. 18 resides in the fact that the hardness of the sprayed coating is lower.

The foregoing conventional ceramic bearings and those disclosed in JP-A-60-81517 and JP-A-60-88215 are not technologies that have been successful when taking into consideration the difficulty in the sintering technology, deterioration in the reliability and unsatisfactory assembling facility due to an increase in the weight caused from increasing the diameter of the bearing and the sleeve.

The non-water supply drainage pump using a combination of the WC sprayed coating and the ceramic bearing (sintered article) ("Trybologist", No. 2, vol. 36) and the bearing structure for a hydraulic turbine that uses a WC sprayed coating and $Cr_3C_2$ sprayed coating (resumes of the twenty-sixth lecture meeting titled "Turbo Machines") are not successfully while considering the hardness factor, the wear resistance and the reliability of the sprayed coating, with the main component being WC or $Cr_3C_2$.

The proposed improved methods for properties of the sprayed coating according to, for example JP-A-57-2872 and JP-A-60-149762 encounter a limitation in coating materials for use therein. As the coating material, those having a thermal expansion coefficient which approximates that of ferrous alloys, which are primary base materials, or these which are not decomposed by the improving heat treatment, are used. The sprayed coating, the main component of which is WC or $Cr_3C_2$, and from which satisfactory hardness can be attained, results in a large difference in the thermal expansion with respect to the base material. As a result, the coating is ruptured and it cannot be used as it is. Furthermore, an apparatus such as a pump that is used in water must be mainly made of stainless steel. Therefore, according to the conventional heat treatment of improving properties of the sprayed coating, the heat treatment temperature is higher than the annealing temperature of a stainless steel as a base material or the temperature at which the stainless steel is sensitized to intergranular corrosion. Hence, the hardness and the wear resistance of the base material deteriorate, causing a problem to arise in that the reliability deteriorates.

That is, the prior art has not taken into consideration any improvement in properties of the sprayed coating, the main component of which is WC that has a large difference in the thermal expansion coefficient from ferrous alloys. Moreover, no consideration has been given with regard to the hardness of the base material and that in the wear resistance.

The prior art disclosed in JP-A-55-90718 and having the arrangement that external water is supplied to the sliding portion of the bearing results in a problem of reliability because the operation of the drainage facility is stopped due to a malfunction of an external water supply apparatus and the drainage operation can be stopped in an emergency.

SUMMARY OF THE INVENTION

An object of the present invention resides in providing a bearing unit adaptable to a drainage pump system or a hydraulic turbine, exhibiting excellent wear resistance and assembling facility and satisfactory reliability, and to a drainage pump and a hydraulic turbine each incorporating the bearing unit, and a method of manufacturing the bearing unit.

The object of the present invention can be achieved by improving the wear resistance of a sprayed coating applied to the bearing surface of a bearing unit by heating the sprayed coating, the main component of which is WC or $Cr_3C_2$, while determining the temperature conditions so as to enable the sprayed coating to be free from a reduction in adhesive characteristics of the coating and denaturing of the coating. The base material of stainless steel is free from excessive reduction in the hardness of the material and sensitivity of the material to intergranular corrosion due to thermal stress.

A bearing unit of the present invention comprising a bearing and a sleeve which is carried by the bearing has an arrangement that the contact surface of the bearing and/or that of the sleeve is applied with the following sprayed coating: a sprayed coating, the main component of which is WC, and which contains one or more elements selected from a group consisting of nickel, chromium and cobalt as a binder material thereof; or a sprayed coating, the main component of which is $Cr_3C_2$, and which contains nickel and chromium as binder materials thereof. The number of blow holes having a size of 20 µm or larger formed in the surface of the sprayed coating is fifteen per one square millimeter ($mm^2$) or less.

The formed sprayed coating is heated at a temperature from 300° C. to 550° C. for not less than one hour to have a hardness of not less than Hv 1000 to have sufficient wear resistance against sediment water containing earth and sand.

The material of the bearing and/or the sleeve applied with the sprayed coating must be ferrous alloys, preferably stainless steel.

If either of the bearing and the sleeve is applied with the sprayed coating, the residual is of SiC or $Si_3N_4$ provided at the contact or bearing surface thereof or may be entirely made of SiC or $Si_3N_4$.

The sleeve or the bearing may be divided into two or more sections.

The drainage pump or the hydraulic turbine according to the present invention incorporates a bearing unit characterized by anyone of the arrangements stated above.

A bearing and/or a sleeve of the present invention are manufactured by the following steps: a sprayed coating, the main component of which is WC, and which contains one or more elements selected from a group consisting of nickel, chromium and cobalt as a binder material thereof, or a sprayed coating, the main component of which is $Cr_3C_2$, and which contains nickel and chromium as binder materials thereof, is formed on the contact surface of the bearing and/or the sleeve machined to have a predetermined shape and made of stainless steel; the bearing and/or the sleeve is heat treated at from 300° C. to 550° C. for not shorter than one hour; and it is subjected to finish machining as to have a predetermined size.

As noted above, upon heating of a sprayed coating, the primary component of which is WC or $Cr_3C_2$, will release the strain which contributes to harden the coating, and therefore the hardness is lowered. It has been considered that, if the spraying coating mainly composed of WC or $Cr_3C_2$ having a small thermal expansion coefficient is formed on a base made of a ferrous alloy, for example (a stainless steel of JIS SUS403, heating of the sprayed coating after the coating has been formed causes the following problems due to the difference in the thermal expansion coefficient namely, adhesion strength of the coating deteriorates due to the thermal stress, and WC particles or $Cr_{32}$ particles are oxidized, causing the properties of the sprayed coating to deteriorate. Therefore, it has been considered that it is not preferable to heat the sprayed coating mainly composed of wC or $Cr_3C_2$ after the coating has been formed. However, the hardness can be improved while eliminating adverse influence on the sprayed coating if proper heating conditions are selected. For example, the hardness of the sprayed coating can be improved by heating from 300° C. to 550° C. for not less than one hour to have sufficient wear resistance against water containing earth and sand.

If blow holes are present in the sprayed coating, the strength of the sprayed coating is decreased. Furthermore, the binding strength between particles of WC or $Cr_3C_2$ is also decreased, causing the particles of WC or $Cr_3C_2$ to be separated from the coating during operation. As a result, the wear resistance deteriorates. However, heat treatment of the formed coating performed for the purpose of eliminating the blow holes will cause particles of the binder metal, and particles of WC or $Cr_3C_2$ to be oxidized, adhesion strength of the sprayed coating to deteriorate, and the hardness and the corrosion resistance of the base material to deteriorate. As a result, the reliability deteriorates. However, it has been found that the present invention enables the number of the blow holes in the sprayed coating to be decreased, with the size of the blow hole to be reduced and the hardness of the sprayed coating to be improved by a heat treatment at a low temperature which does not cause the oxidation of the WC or $Cr_3C_2$ sprayed coating, deterioration of adhesion strength of the coating due to the thermal stress and the deterioration of the hardness and the corrosion resistance of the base material. The above effects can be obtained by selecting the temperature and the time in which heating is performed.

In particular, it has been found that heat treatment conditions according to the present invention enables a reduction in the number of large blow holes, that is, blow holes having a size of not less than 20 µm larger than a maximum particle size of particles of WC or $Cr_3C_2$. The large blow holes separate particles of WC or $Cr_3C_2$ from the coating. Therefore, the decrease in the number of the large blow holes may improve the strength of the sprayed coating. If the number of the large blow holes is reduced, the sprayed coating becomes ductile thereby resistance to impacts As a result, occurrence of rupture and separation of the coating can be prevented and the reliability of the coating therefore is improved.

Since the blow hole serves as a corrosion trigger of the sprayed coating, a reduction in the number of the blow holes causes particles of WC or $Cr_3C_2$ to be positioned more closely to one another. Therefore, corrosion generated between the particles can be prevented and the corrosion resistance against drain can be improved.

If the drainage pump of the present invention is used to serve as a precedent standby operation drainage pump, the arrangement that the bearing, which can be operated without lubrication, is employed will enable satisfactory reliability to be attained.

By constituting the sleeve and/or the bearing to have a separated structure, the manufacturing process can be simplified. It is especially suitable to a large-diameter pump.

Other and further objects, features and advantages of the invention will be appear more fully from the following description.

DETAILED DESCRIPTION OF PREFERRED EMBODIMENT

Figure 1:
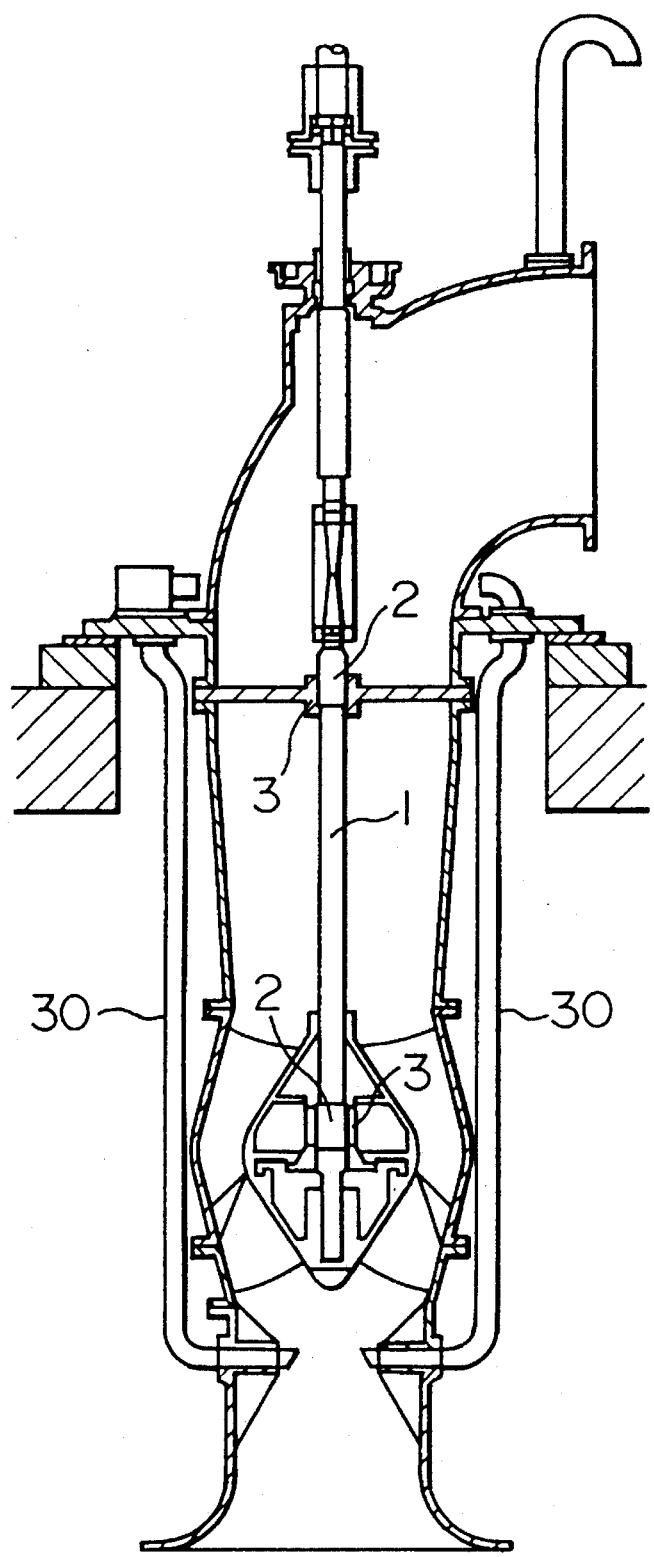
FIG. 1 is a cross sectional view which illustrates the structure of a drainage pump according to an embodiment of the present invention.

In general, a drainage pump has two bearings respectively disposed adjacent to an impeller and in an upper portion thereof. A bearing unit according to this embodiment can be adapted to either of the two bearings. Referring to FIG. 1, reference numeral 1 denotes a main shaft, 2 a sleeve fixedly attached on the main shaft 1, and 3 a bearing. The main shaft 1, the sleeve 2 and the bearing 3 are fashioned of a stainless steel of JIS SUS403.

The pump is provided with a plurality of pipes 30 each of which has a lower end opening in a drain suction port zone of a pump casing and an upper end opening in the atmosphere, and is vertically arranged along the outer surface of the casing, and which is supported by a rib of the casing at a lower end and by a floor of the drainage facility.

In the pump, if the drainage water level is low, difference takes place between the internal pressure of the pump and the atmosphere, causing air to be sucked into the drain through the pipe.

As a result, the quantity of the flow is reduced and generation of vortexes in the drain level is restricted. The generation of the vortexes must be prevented because it causes vibration force to be generated, thus resulting in the vibration of the pump. By sucking air through the pipe 30, the generation of the vortexes can be prevented even if the waver is a low level at which the vortexes are easily generated. Therefore, drainage can be performed stably.

If the water level has been raised sufficiently, the pressure difference across the casing is reduced, causing the suction of air through the pipes 30 to be interrupted. Since the pressure change in the casing taking place due to the drain level is utilized, any external control is not required and accordingly satisfactory reliability is attained.

By providing a valve at the upper opening end portion of the pipes 30, the quantity to be suctioned can be controlled and the above-mentioned function can be cancelled.

Figure 2:
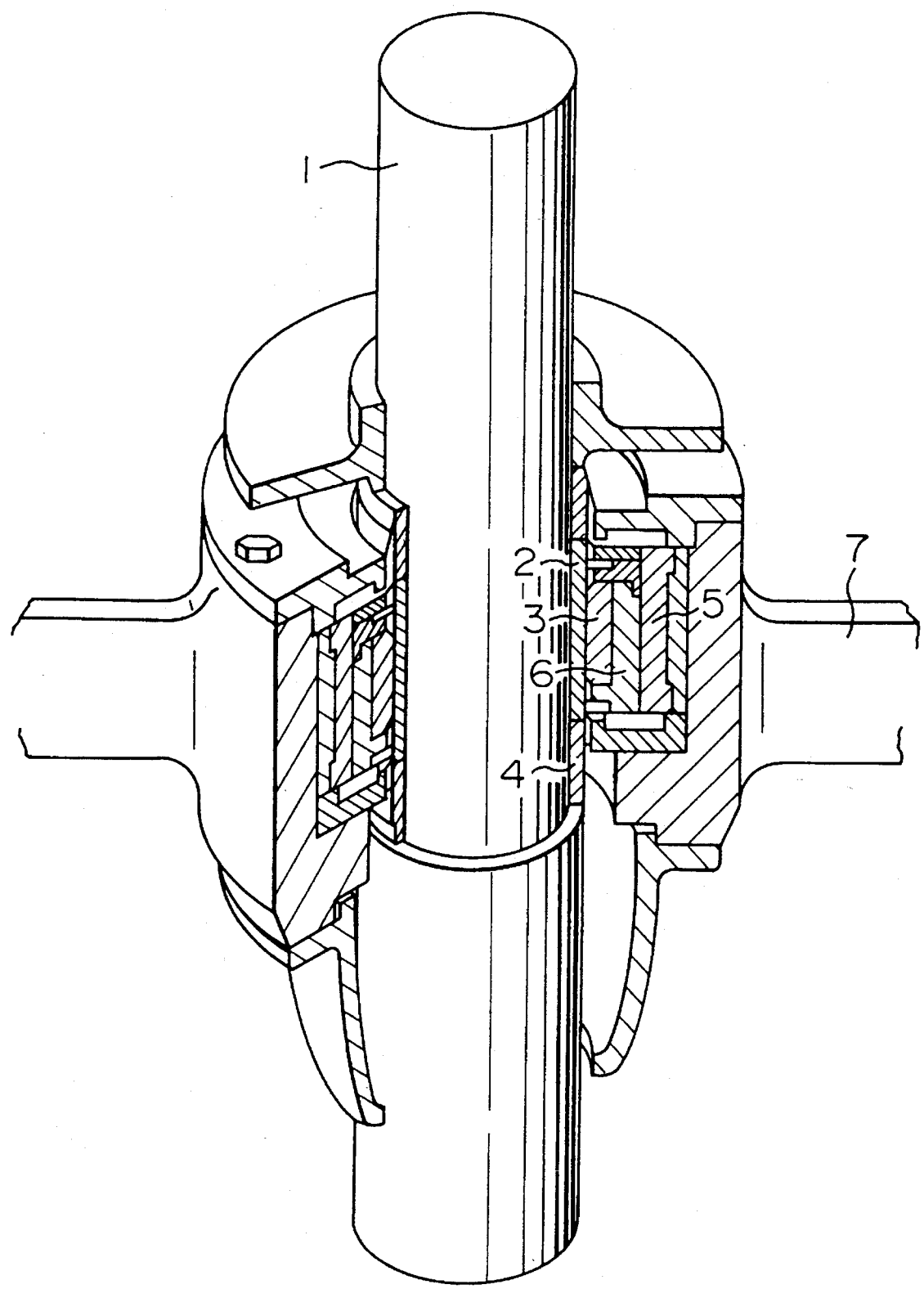
FIG. 2 is a perspective view partially including a cross sectional view which illustrates a bearing unit according to an embodiment of the present invention.
Figure 3:
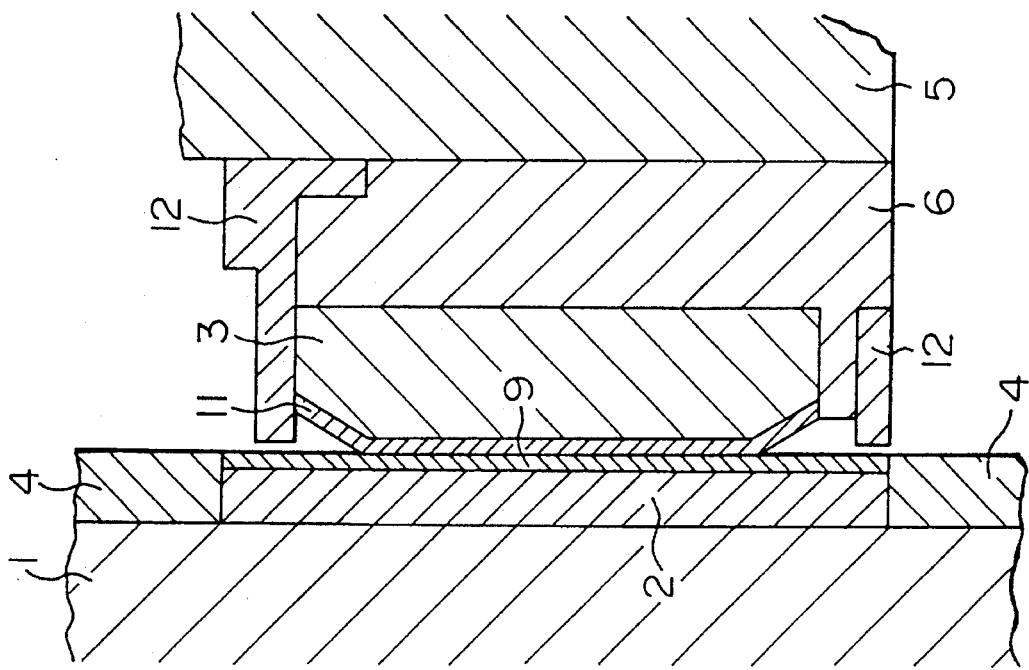
FIG. 3 is a vertical cross sectional view which illustrates a bearing unit according to another embodiment of the present invention.

As shown in FIGS. 2 and 3, the sleeve 2 and the bearing 3 are manufactured as follows: a sleeve base and a bearing base are manufactured by machining; and heat treatments of quenching and tempering are performed to improve the hardness of a stainless steel of JIS SUS403. The tempering temperature is about 700° C. so that the stainless steel of JIS SUS403 does not become brittle at the time of improving the property of the sprayed coating to be performed later. After the heat treatment was completed, sprayed coatings 11 and 9 were formed on a sliding portion of the bearing 3 and the sleeve base by a high speed flame spraying method, the sprayed coatings 11 and 9 being mainly composed of WC and containing NiCr as a binder metal. After the sprayed coatings 9 and 11 were formed, a heat treatment was performed by holding the bearing 3 and the sleeve base at 400° C. for twenty hours to improve the hardness of the sprayed coatings 9 and 11. After the heat treatment was completed, the sleeve 2 and the bearing 3 were machined to respectively have predetermined inner and outer diameters and a predetermined surface roughness. The sleeve 2 is secured to the main shaft 1 by a rotation stopper 4.

The bearing 3 is fastened to a metallic backing member 6 for the bearing 3 followed by being fixed by a fixing member 7 while interposing a buffer material 5 for the bearing 3. Furthermore, an invasion prevention member 12 for preventing invasion of sediment into the sliding portion was fastened to the bearing 3.

Since this embodiment has the arrangement that stainless steel of JIS SUS403 is employed as the material for the sleeve base, its thermal expansion coefficient coincides with that of the material of the main shaft 1. As a result, generation of thermal stress can be prevented. Furthermore, the realized satisfactory toughness enables the sleeve to be obtained which is able to stably holding the sprayed coating formed on the surface thereof.

Furthermore, the heat treatment applied to the WC sprayed coating enables the wear resistance to be improved, causing the durability and the reliability of the bearing unit to be improved.

Although this embodiment has the arrangement that the sprayed coating to be formed on the sleeve and the bearing is mainly composed of WC and contains NiCr as the binder material, a similar effect was obtained from a sprayed coating, the main component of which was WC, and which used cobalt as the binder material, and a sprayed coating, the main component of which was $Cr_3C_2$, and which used NiCr as the binder material.

The drainage pump exhibits stable bearing performance even if the bearing unit is under nonlubrication state, that is, non-water-supply state. If water is supplied, the drainage pump is able to further satisfactorily perform the bearing operation.

The drainage pump has also an invasion prevention member to prevent invasion of sediment into the bearing or contact portion of the bearing unit. If sediment mixed with the drain, however, invades into the sliding portion, the operation can be performed stably because the bearing portion exhibits satisfactory wear resistance.

Figure 4:
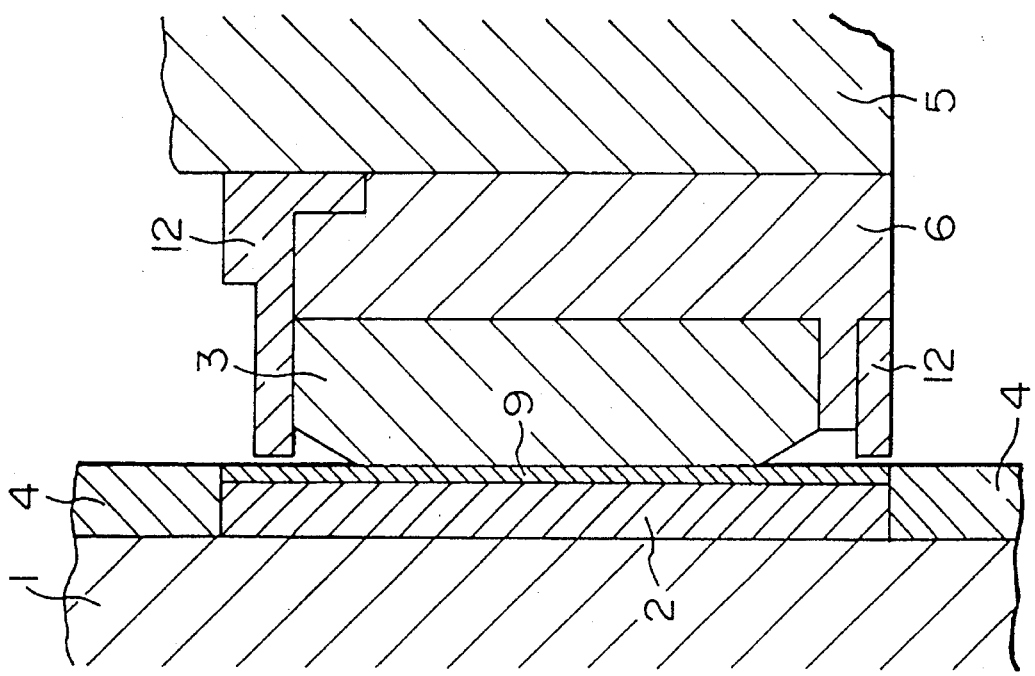
FIG. 4 is a vertical cross sectional view which illustrates a bearing unit according to another embodiment of the present invention.

Since excellent bearing performance is attained in a non-lubrication state, the drainage pump can be reliably operated in a state where no-lubrication operation and lubricated operation are repeated, that is, in the precedent standby operation. As shown in FIG. 4, the contact surface of the sleeve base, made of a stainless steel of JIS SUS403, is applied with the sprayed coating 9, the main component of which was WC, and which contained cobalt as the binder material. Furthermore, a bearing 13 which supports the sleeve 2 is made of SiC. The sleeve 2 was subjected to a heat treatment of 400° C. for twenty hours after the sprayed coating 9 was formed so as to improve the hardness of the sprayed coating 9. The residual structures are the same as those described above in connection with FIGS. 1 to 3.

Since this embodiment has an arrangement that the material of the bearing portion is uniform, hard and sintered ceramics, the durability and the reliability of the bearing unit can be improved.

Figure 5:
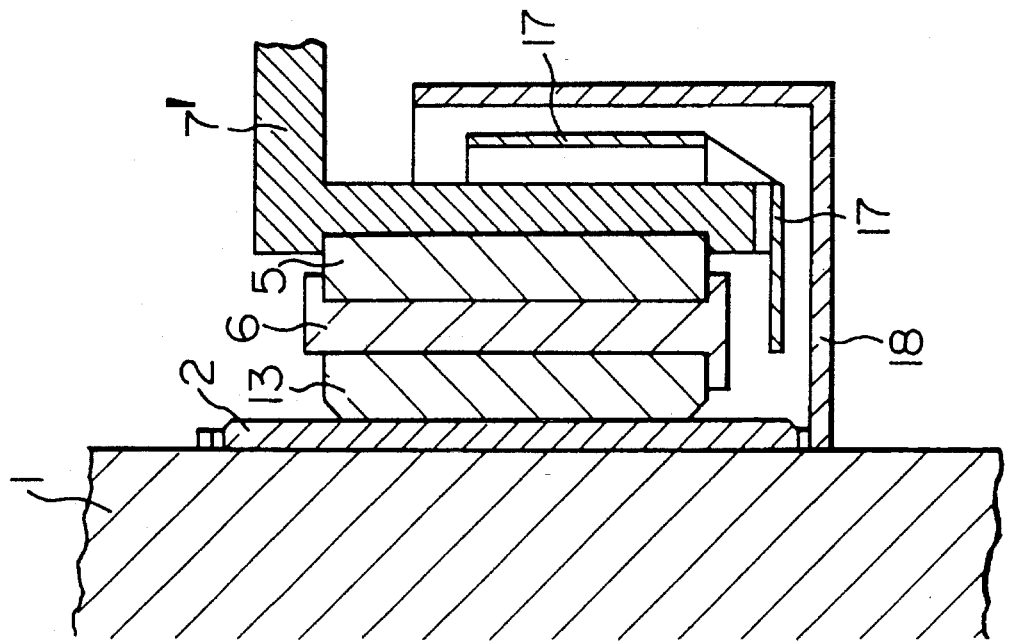
FIG. 5 is a vertical cross sectional view which illustrates a bearing unit according to another embodiment of the present invention.
Figure 6:
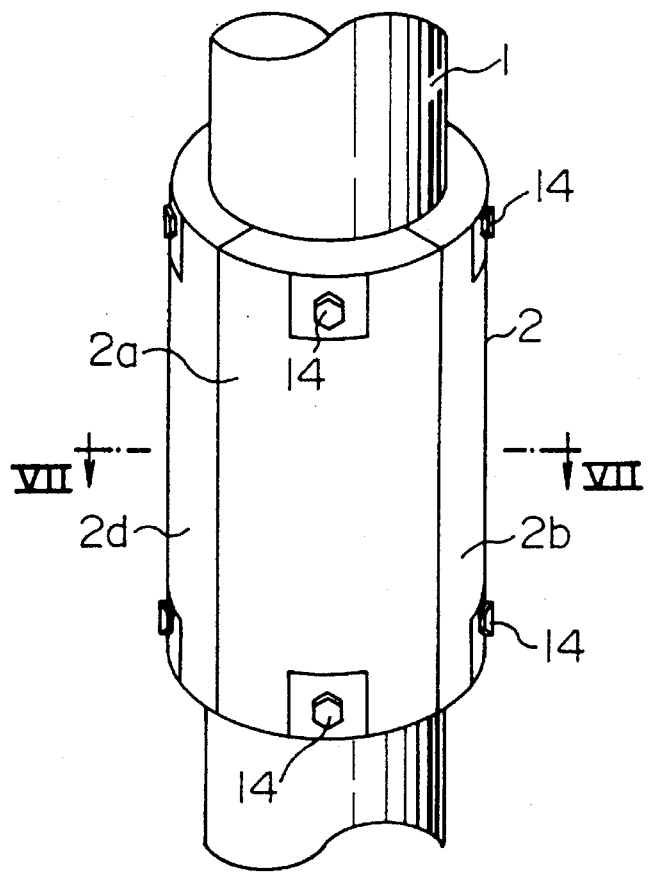
FIG. 6 is a perspective view which illustrates the structure of a sleeve according to another embodiment of the present invention.
Figure 7:
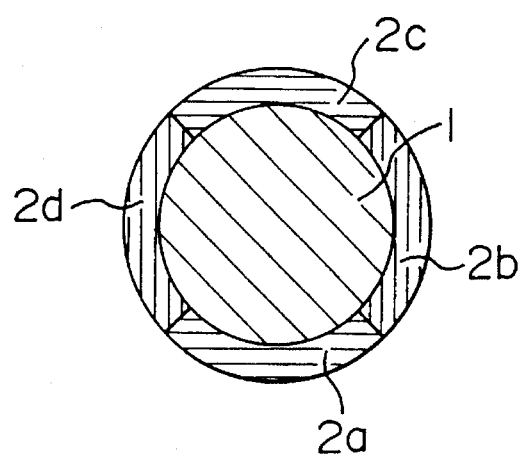
FIG. 7 is a cross sectional view taken along line VII—VII of FIG. 5.

Although this embodiment has the arrangement that the sprayed coating to be formed on the sleeve is mainly composed of WC and contains NiCr as the binder metal, a similar effect is obtained from a sprayed coating, the main component of which is WC, and which uses cobalt as the binder material, and a sprayed coating, the main component of which was $Cr_3C_2$, and which used NiCr as the binder material. The embodiment of FIG. 5 illustrates an arrangement about a bearing structure capable of performing an idling operation even if the drainage water level does not reach the height of the bearing at the time of a precedent standby operation. It is noted that the detailed cross sectional structure of the sleeve 2 is omitted from illustration in order to show the overall structure. A sprayed coating (not shown), the main component of which is WC, and which contained NiCr as the binder metal, was applied to the contact surface of the sleeve 2 made of stainless steel of JIS SUS403. After the sprayed coating 11 has been formed, a heat treatment set to 400° C. for 20 hours is performed to improve the hardness of the sprayed coating. Furthermore, the bearing 13 which supports the sleeve 2 is made of SiC. The bearing 13 is fastened to the metallic backing member 6 and fixed to a fixing member 7' while interposing the buffer material 5. Furthermore, a backing plate 17 is secured to the fixing member 7'. In addition, a rotary water tank 18 is secured to the main shaft 1. Water is enclosed in the rotary water tank 18 so that lubricant water is present in the contact portion of the bearing if the idle operation is performed in which the drainage water level does not reach the height of the bearing. The structure according to this embodiment encounters a fact that earth and sand are sometimes invaded into the contact portion at the time of the operation because the rotary water tank 18 easily accumulates the sediment. However, the sprayed coating 11 on the contact surface of the sleeve 2 has sufficient wear resistance attained due to the heat treatment, resulting no problem to arise. In accordance with the embodiment of FIGS. 6 and 7, four circumferentially disposed sleeve sections. 2a, 2b, 2c and 2d of stainless steel of JIS SUS403 are provided. A sprayed coating, the main component of which is $Cr_3C_2$, and which contained NiCr as the binder metal, is formed on the contact surface side of each of the sleeve sections 2a, 2b, 2c and 2d with which the bearing is brought into contact. The sleeve sections 2a, 2b, 2c and 2d were subjected to a heat treatment of 400° C. for twenty hours. Each of the sleeve sections 2a, 2b, 2c and 2d is fixed to the main shaft 1 by two bolts 14 at the axial directional two portions thereof. The residual structures are the same as those according to the foregoing embodiments shown in FIGS. 1 to 3. The sleeves sections 2a, 2b, 2c and 2d are manufactured by using stainless steel of JIS SUS403, and they are subjected to the heat treatment arranged similarly to that applied to the method of manufacturing the bearing. After the heat treatment has been completed, sprayed coating WC, the main component of which is WC, and which contains NiCr or cobalt as the binder material, is formed on the contact surface of each sleeve by high speed flame spraying. After the sprayed coating has been formed, the sleeve, formed by the sleeve sections 2a, 2b, 2c, 2d is heated to 400° C. and held at the temperature for twenty hours. After the heat treatment has been completed, the sleeve is fixed to the main shaft 1, and the sleeve is machined to have a predetermined size. Although the bolts are sufficient to fix the sleeve to the main shaft 1, use of an adhesive agent will improve the reliability.

Figure 8:
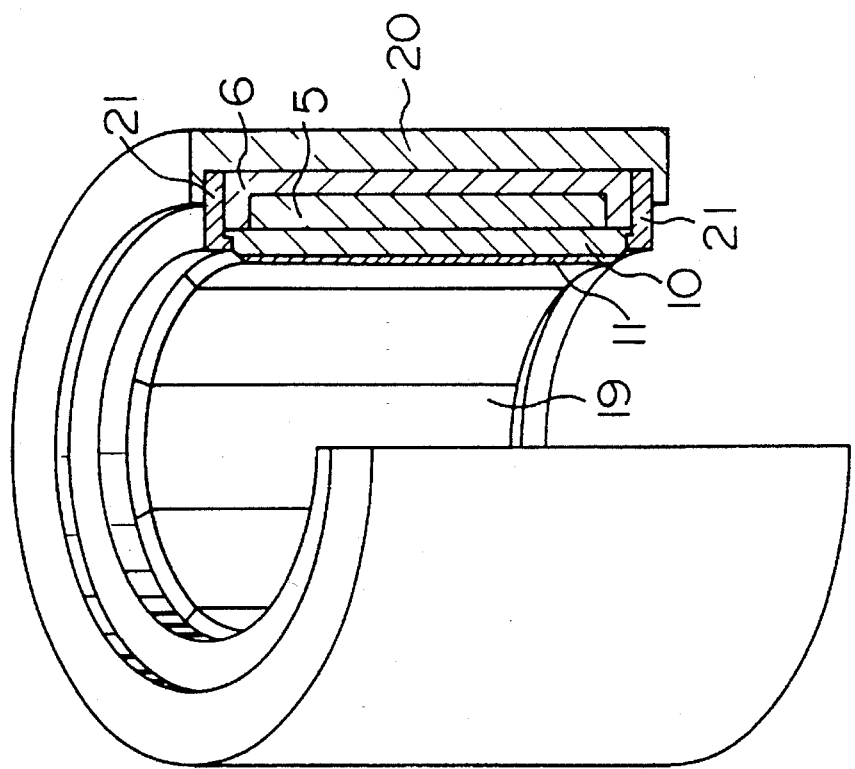
FIG. 8 is a perspective view partially including a cross sectional view which illustrates a bearing according to another embodiment of the present invention.

Since this embodiment has an arrangement that the sleeve is divided into a plurality of sections 2a, 2b, 2c, 2d the operation for forming the sprayed coating can be facilitated. Furthermore, the width of each of the divided sleeve sections can be reduced to a quarter of the corresponding integrated sleeve, causing an effect to be obtained in that the sleeve can be handled easily. In the embodiment of FIG. 8 an arrangement is provided wherein bearing sections 19 are formed by dividing the bearing portion of a bearing. Each of the bearing sections 19 is produced by forming the sprayed coating 11 thereon, the main component of which is WC, and which contains NiCr or cobalt as the binder metal, by high speed flame spraying on the base 10 made of stainless steel of JIS SUS403. After the sprayed coating has been formed, a heat treatment of 400° C. for twenty hours is performed to improve the hardness of the sprayed coating. The bearing sections 19 are fastened to the metallic backing member 6 while interposing the buffer material 5, the bearing sections 19 being then disposed in a bearing housing 20. Although the bearing sections 19 are fastened to the bearing housing 20 by a fixing jig 21, use of an adhesive agent will improve the reliability.

Since this embodiment has an arrangement that the bearing portion of the bearing is divided into a plurality of sections, the sprayed coating can easily be formed. Furthermore, the arrangement that each sliding section 19 is fixed while interposing the buffer material 5 will effectively prevent an unsymmetrical contact.

Figure 9:
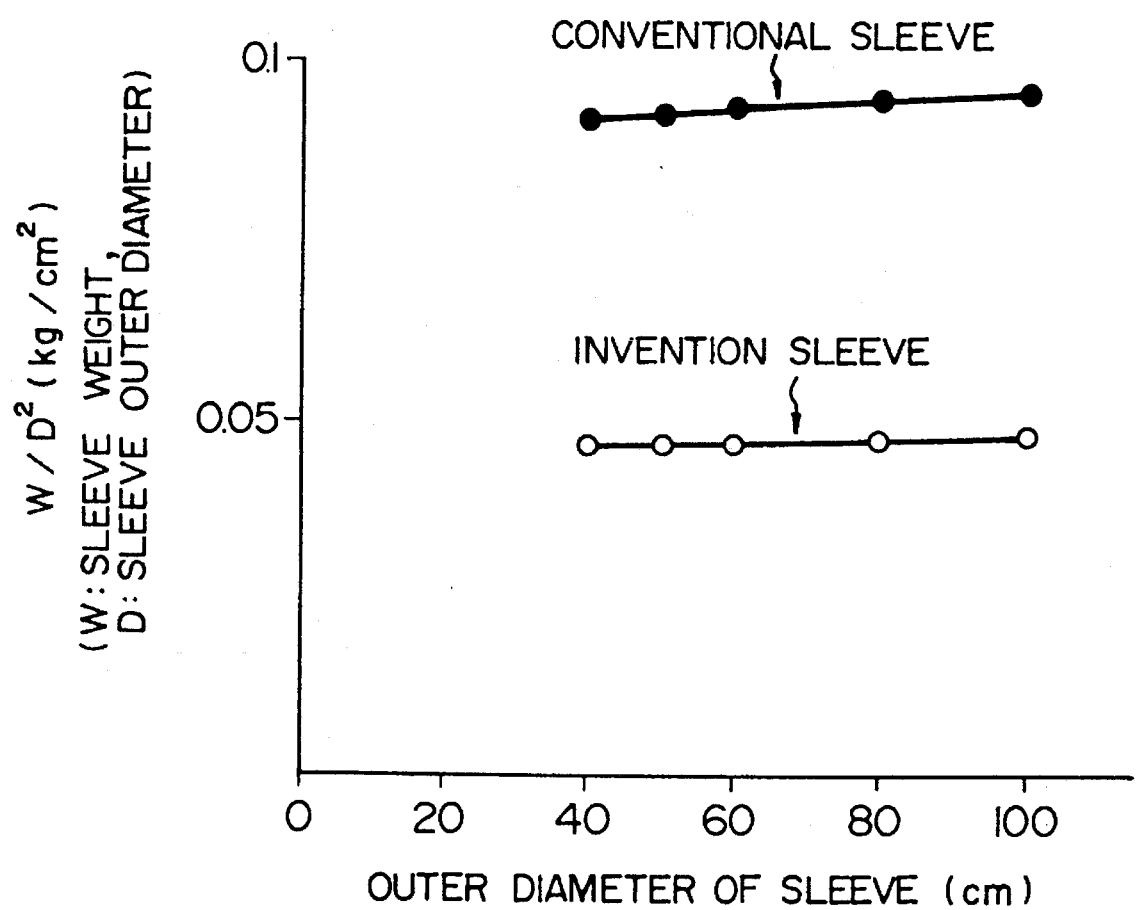
FIG. 9 is a graph which shows the relationship $W/D^2$ between the outer diameter "D" of a sleeve according to another embodiment of the present invention and the weight "W"
Figure 10:
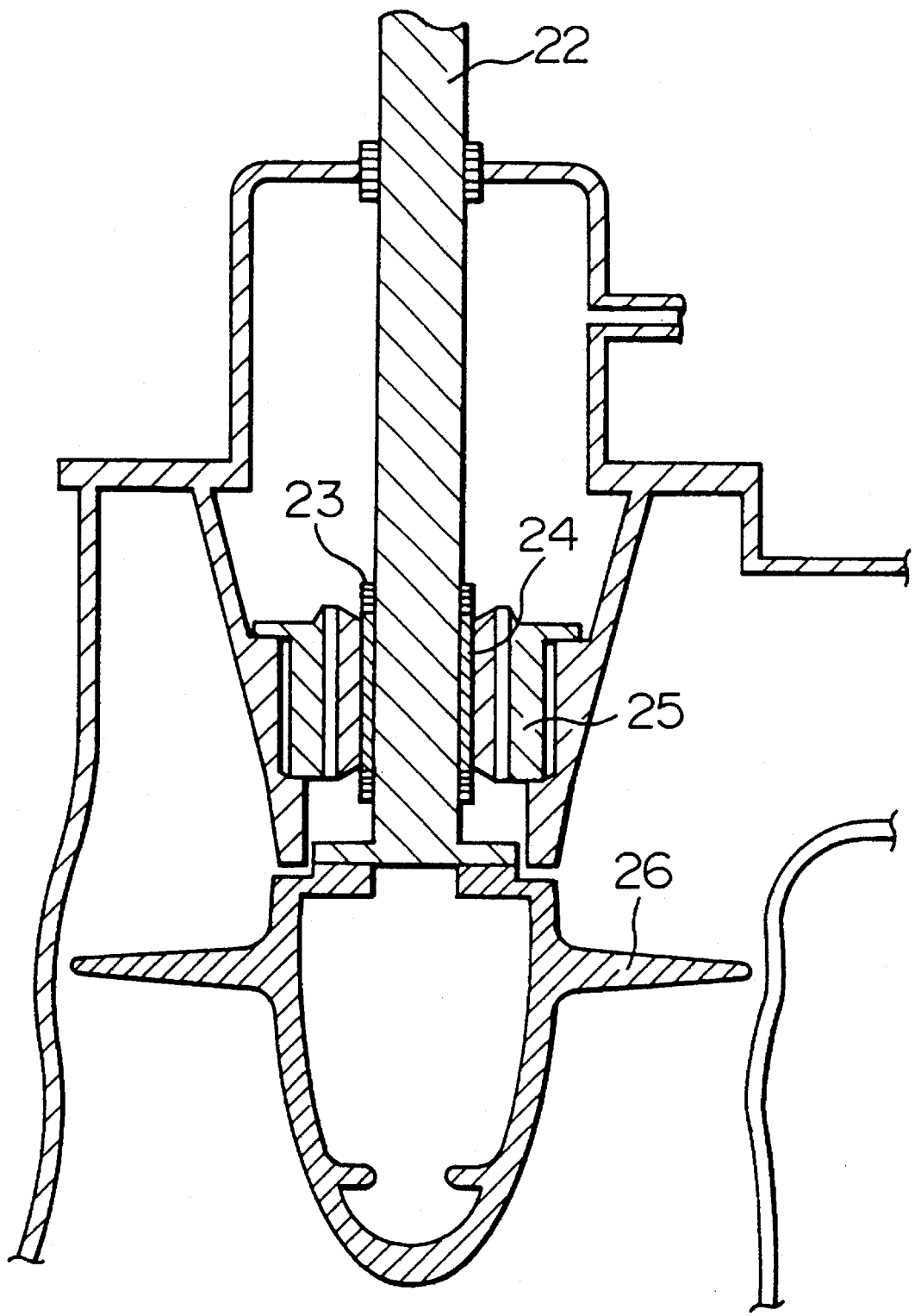
FIG. 10 is a cross sectional view which illustrates the structure of a hydraulic turbine according to another embodiment of the present invention.

The sleeve which has been made by sintered carbide mainly composed of WC can be made of a stainless steel according to the present invention. Therefore, the weight can be considerably reduced. Furthermore, the arrangement that the sleeve base is made of stainless steel will enable thread hole machining to be performed. Therefore, handling can be facilitated. In particular, a significant effect can be obtained from the present invention if a sleeve has a large diameter. The effects of the present invention attained to reduce the weights of sleeves are collectively shown in FIG. 9. Since the sleeve weight "W" is varied when the outer diameter "D" of the sleeve is changed, the relationship is standardized to $W/D^2$. According to the present invention, a $W/D^2$ of 0.05 or less is attained. Referring to FIG. 10, reference numeral 22 represents a main shaft for a hydraulic turbine, and 23 represents a sleeve rotation stopper. Reference numeral 24 represents a sleeve made of stainless steel of JIS SUS403 manufactured by forming a sprayed coating (hereinafter called a "WC-27% NiCr sprayed coating"), the main component of which is WC, and to which NiCr is added by 27 weight % as a binder metal, followed by heat treatment applied thereto. Reference numeral 25 represents a bearing made of stainless steel of JIS SUS403 manufactured by forming a sprayed coating (hereinafter called a $Cr_3C_2$-25% NiCr sprayed coating), the main component of which is $Cr_3C_2$ subjected to a heat treatment, and to which NiCr is added as a binder metal by 25% and by applying heat treatment. Reference numeral 26 represents a liner. The sprayed coating was formed on the surface of the sleeve and the bearing by using a high speed flame spraying method. As can be understood from the aforesaid results of the element test, the sprayed coating subjected to the heat treatment has wear resistance similar to that attained from the sintered article. Furthermore, the aperture can easily be enlarged and therefore an effect of reducing the cost and the weight can be obtained if the arrangement of this embodiment is adapted to a hydraulic turbine.

The wear resistance properties of the bearing according to the foregoing embodiment were evaluated by examining the change in the hardness of the sprayed coating taken place due to heat treatment applied. The change in the hardness of the sprayed coating was examined under conditions: heating temperature was ranged from 200° C. to 600° C.; and heating time was ranged from 1 to 30 hours. The hardness of the sprayed coating was measured by a Vickers hardness meter. In order to eliminate the influence of the base, the hardness was measured at the cross sectional of the sprayed coating and a load of 300 g is equally applied.

Figure 11:
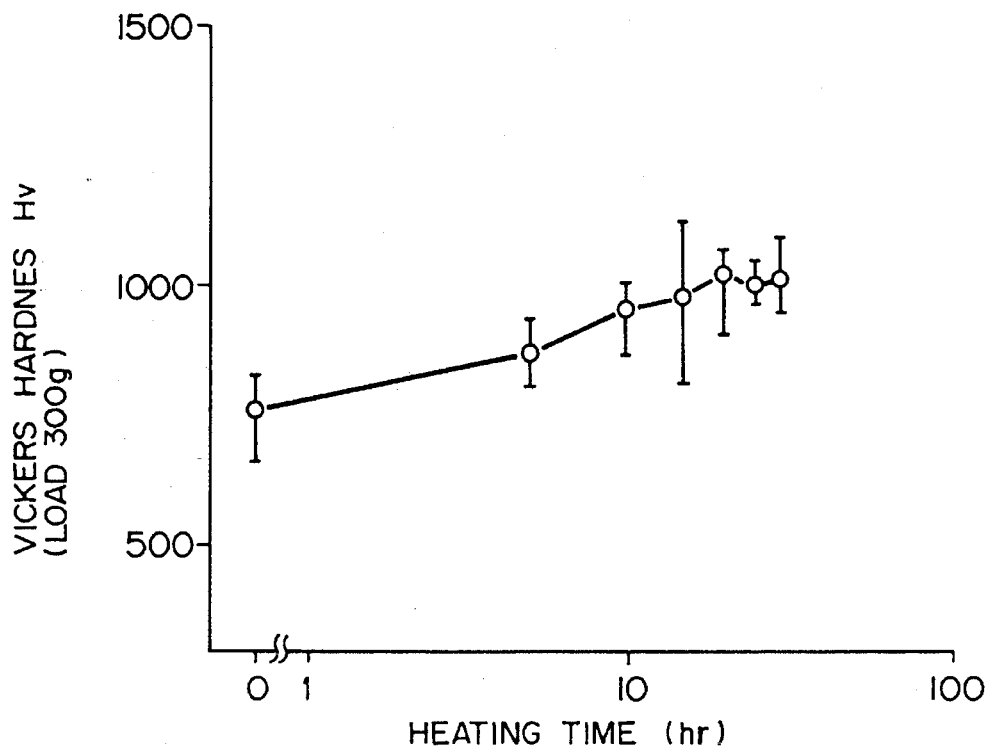
FIG. 11 is a graph which illustrates change in the hardness of a WC-27% NiCr sprayed coating taken place when it is heated at 400° C.

FIG. 11 illustrates a portion of the results of the aforesaid measurements, wherein change in the hardness taken place when a WC-27% NiCr sprayed film is heated to 400° C. is shown. The of abscissa stands for the heating time, while the ordinate stands for the hardness of the sprayed coating. The sprayed coating was formed by high speed flame spraying to have a thickness of about 100 mm after the surface has been polished. The base is made of stainless Steel of JIS SUS403 and is subjected to heat treatments of quenching and tempering at about 700° C. Since the values of the measured hardness disperse, ten points were measured to show the maximum value and the minimum value of the measured values are designated by a line while showing average values by a mark "○"

As shown in FIG. 11, the hardness of the sprayed coating increases with heat treatment time and reaches its maximum hardness in ten to thirty hours. Then, the hardness becomes substantially constant value although slight dispersion takes place. The maximum value of the average hardness is Hv 1014 (maximum value Hv 1065 and minimum value Hv 890). The thus attained hardness is inferior to an average value of Hv 1317 (maximum value Hv 1404 and minimum value Hv 1235) of the hardness of a sintered article (hereinafter called a "WC-12% cobalt sintered article), the main component of which is WC, and to which cobalt is, as the binder, added by 12 weight %. However, an increase of an average value of about 34% is attained as compared with an average value of Hv 727 (maximum value Hv 869 and minimum value Hv 604) of the hardness realized before the heat treatment is performed, resulting in a significant improvement.

Figure 12:
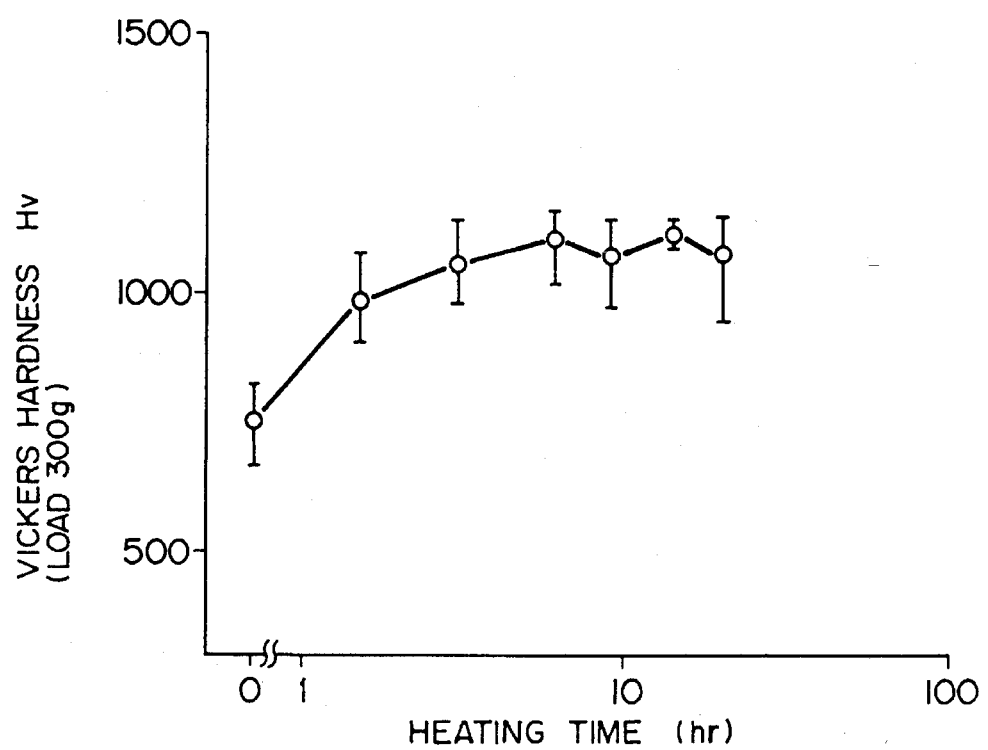
FIG. 12 is a graph which illustrates change in the hardness of a WC-27% NiCr sprayed coating taken place when it is heated at 500° C.

FIG. 12 illustrates a part of the results of the measurements, wherein change in the hardness taken place when a WC-27% NiCr sprayed coating is heated to 500° C. is shown similarly to FIG. 11. The method of forming the sample, the shape of the same and the method of measuring the hardness are the same as those employed to obtain the results shown in FIG. 11. The hardness of the sprayed coating substantially reaches the maximum hardness when the sample is heated for about 1.5 hours. The maximum value of the average hardness is Hv 1115 (maximum value Hv 1139 and minimum value Hv 1084). The average value is increased by about 47% as compared with the hardness realized before the heat treatment is applied, resulting in similar hardness to that of the WC-12% cobalt sintered article.

Figure 13:
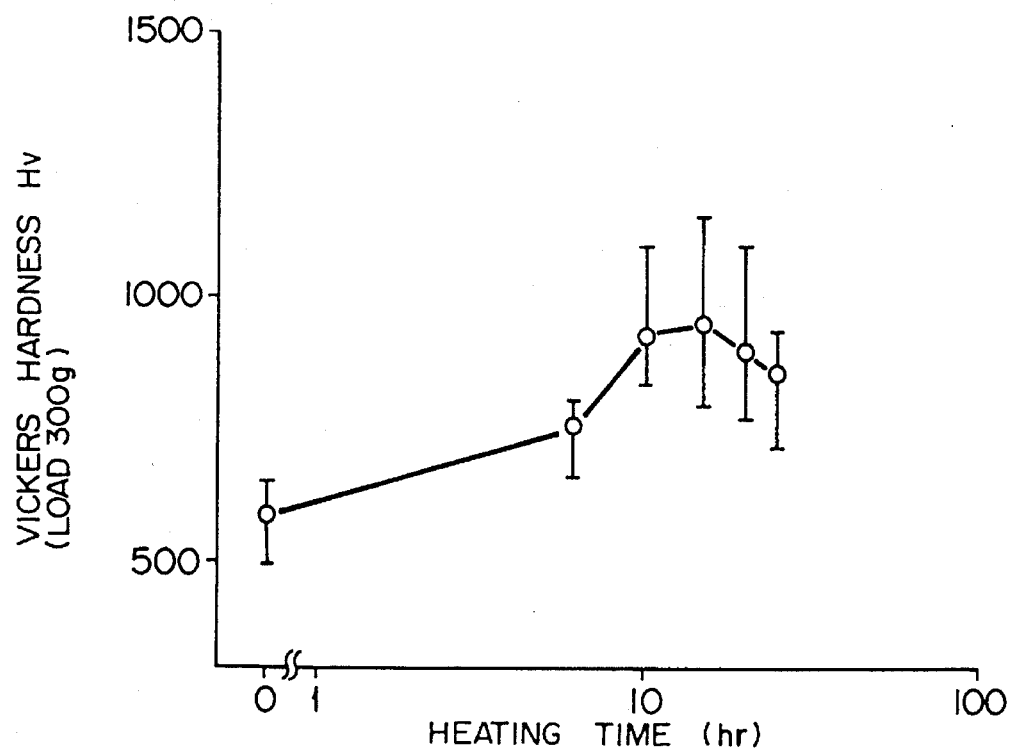
FIG. 13 is a graph which illustrates change in the hardness of a WC-12% cobalt sprayed coating taken place when it is heated at 400° C.

Also FIG. 13 shows a part of the results of the measurements, wherein change in the hardness taken place when a sprayed coating (hereinafter called a WC-12% cobalt sprayed coating), the main component of which is WC, and to which cobalt is, as the binder material, added by 12 weight %, is heated to 400° C. is shown. Also the WC-12% cobalt sprayed coating is formed by the high flame spraying similarly to each sample shown in FIGS. 11 and 12 to have a thickness of about 100 μm after its surface has been polished. The base is made of stainless steel of JIS SUS403 subjected to the heat treatment. Also the shape of the sample and the method of measuring the hardness are the same as those employed to obtain the results shown in FIGS. 11 and 12. The hardness of the WC-12% cobalt sprayed coating increases with heat treatment time and reaches the maximum hardness in 10 to 20 hours, followed by slight deterioration in 25 hours. The average value of the maximum hardness is Hv 946 (maximum value Hv 1149 and minimum value Hv 792). An increase in the average value of about 62% is attained as compared with an average hardness value of Hv 584 (maximum value Hv 1149 and minimum value Hv 490) realized before the heat treatment. A similar hardness change to that attained in the case of the WC-27% NiCr sprayed coating was taken place in the case where heating to 500° C. was performed. In this case, the maximum hardness was attained by performing heating for about one hour.

Figure 14:
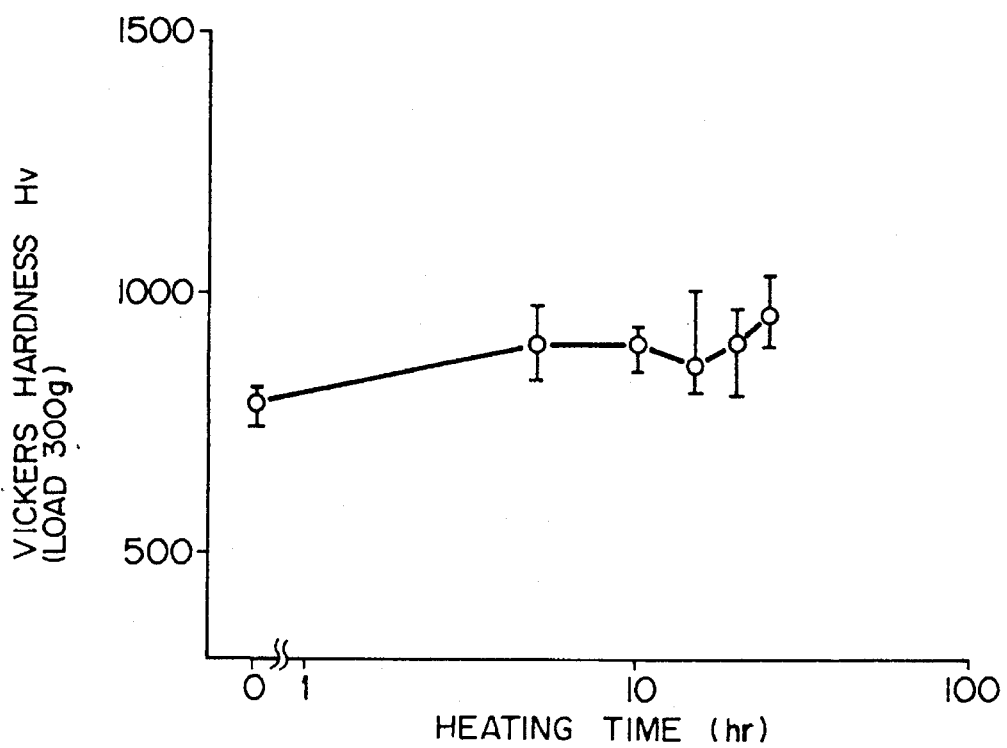
FIG. 14 is a graph which illustrates change in the hardness of a $Cr_3C_2$ 25% NiCr sprayed coating taken place when it is heated at 400° C.

Also FIG. 14 shows a portion of the results of the measurements, wherein change in the hardness is shown which takes place when a $Cr_3C_2$-25% NiCr sprayed coating is heated at 400° C. Also the $Cr_3C_2$-25% NiCr sprayed coating is formed by a similar high speed flame spraying employed to form each sample for use in the measurement shown in FIGS. 11, 12 or 13 to have a thickness of about 100 μm after its surface has been polished. The base is made of stainless steel of JIS SUS403 subjected to the heat treatment. The shape of the sample and the method of measuring the hardness are the same as those employed to obtain the results shown in FIGS. 11, 12 and 13. The hardness of the $Cr_3C_2$-25% NiCr sprayed coating gradually increases with heat treatment time. The maximum value of the average hardness in 25 hours of heating is Hv 958 (maximum value Hv 1043 and minimum value Hv 905). The average value increased by about 21% as compared with an average value Hv 791 (maximum value Hv 817 and minimum value Hv 744) of the hardness before the heat treatment is performed. In this case, the attained increased is inferior to that realized in the case of the WC-27% NiCr sprayed coating and the WC-12% cobalt spray coating. Also the hardness increases with time likely the case in which heating to 400° C. is performed, resulting in a larger degree.

The hardness of each of the foregoing WC-27% NiCr sprayed coating, the WC-12% cobalt sprayed coating. and the $Cr_3C_2$-25% NiCr sprayed coating is significantly improved due to the heating from 400° C. to 500° C., resulting in hardness equivalent to the hardness of WC-12% 12% cobalt sintered article. It can be considered that the heating from 400° C. to 500° C. increases the binding strength for particles of WC or $Cr_3C_2$ with the binder material in the sprayed coating to a level substantially equivalent to the sintered article.

The results of examinations of the heating temperature range from 200° C. to 600° C. and a heating time range from one to thirty hours will now be described. Although the hardness of the sprayed coating increases if the heating temperature is set to 300° C. or lower, the increase ratio is excessively low, resulting in a difficulty in industrial use. It is therefore preferable that the heat treatment temperature be 300° C. or higher, more preferably 350° C. or higher. However, thermal stress is generated, causing the adhesive strength of the film to deteriorate and resulting in a separation of the film from the base material in an excessive case due to the difference in the thermal expansion coefficient between the sprayed coating and the base because of the following fact: ferrous alloys for use to form the pump has a thermal expansion coefficient of about 12 to $17 \times 10^{-6}$/°C. and WC or $Cr_3C_2$ type sprayed coating has a thermal expansion coefficient of about 5 to $7 \times 10^{-6}$/°C. Furthermore, the heat treatment performed in the atmosphere will cause an oxidation of the sprayed coating to take place, resulting in a deterioration of the wear resistance. Therefore, if the WC or $Cr_3C_2$ sprayed coating is used, the heat treatment temperature must be set to 550° C. or lower, preferably 500° C. or lower. In order to prevent the oxidation of the sprayed coating, it is preferred to perform heating in inert gas or in vacuum.

Figure 15A:
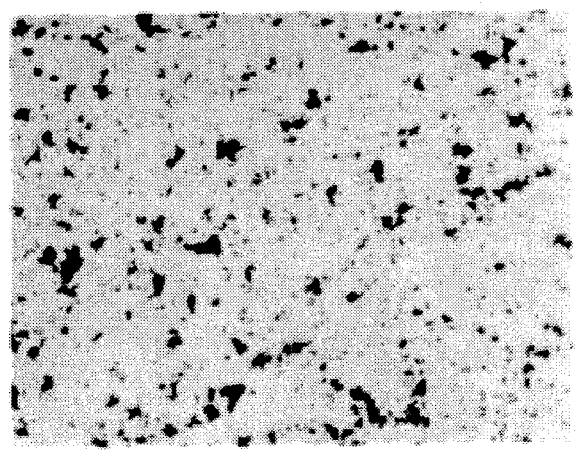
FIGS. 15A, 15B and 15C are photographs which illustrate the change of the surface of the WC-27% NiCr sprayed coating when it is heated at 400° C.
Figure 15B:
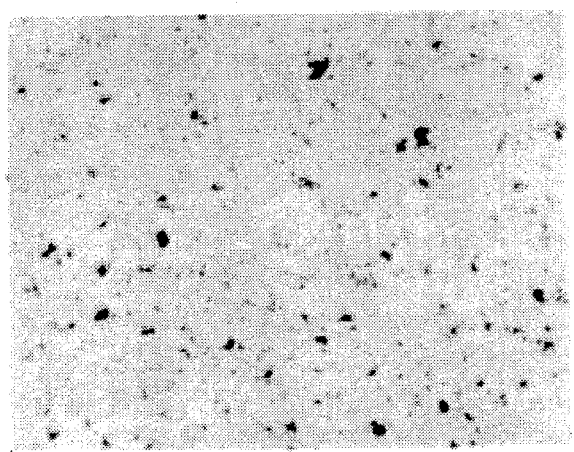
Figure 15C:
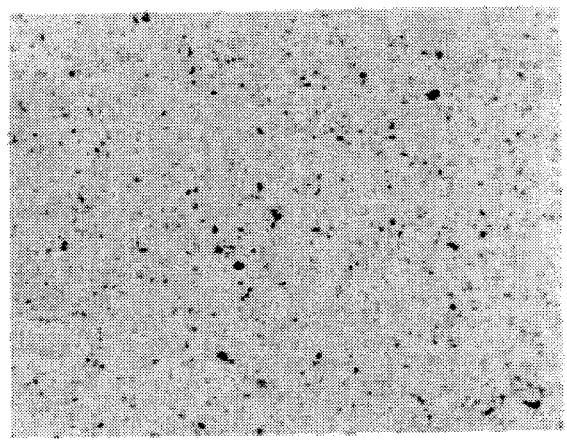

FIG. 15 shows a microscopic photograph of a state where the WC-27% NiCr sprayed film formed to have a thickness of abut 200 μm was heated at 400° C. followed by performing surface polishing until the thickness is reduced to about 100 μm, and heating is again performed followed by performing polishing to attain a mirror surface. The final thickness is about 90 μm. FIG. 15A is a photograph of the surface of nontreated sprayed coating, FIG. 15B is a photograph of the surface of the sprayed coating after it has been heated for 10 hours, FIG. 15C is a photograph of the surface of the sprayed coating after it has been heated for 20 hours. Each of the photographs are taken at a magnification of 100 times. Since the observation is observed with no etching performed, the difference between the WC particles and the binder material NiCr cannot be observed, resulting in being observed as a full white base. Referring to FIGS. 15A, 15B and 15C, dotty black portions are blow holes. Comparing FIGS. 15A, 15B and 15C, the number of the blow holes decreases the size of the same is reduced with a lapse of the heat treatment time. Since the samples for use in the experiments are, by cutting, obtained from a sprayed coating formed on a plate (26 mm×26 mm) made of stainless steel of JIS SUS403, the difference in the number of the blow holes has not taken place due to the spraying conditions but has taken place due to the fact that the number of the blow holes has decreased by the heat treatment. A similar phenomenon was observed in the WC-12% cobalt sprayed coating or the $Cr_3C_2$-25% NiCr sprayed coating.

Figure 16:
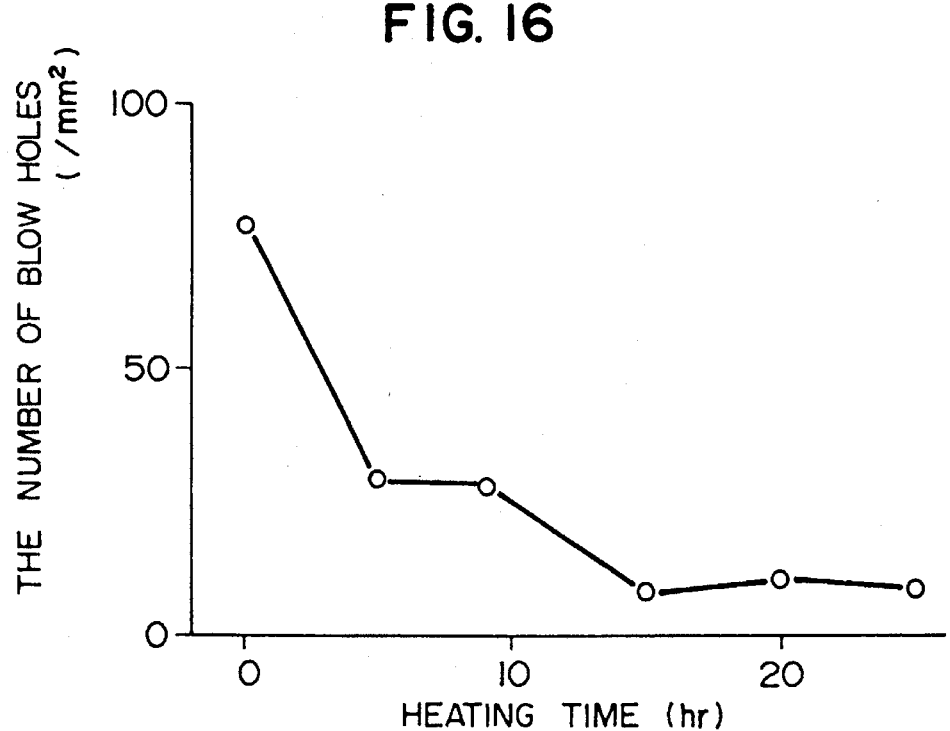
FIG. 16 is a graph which illustrates the relationship between the number ratio of blow holes in the surface of the WC-27% NiCr sprayed coating and the heating time when it is heated at 400° C.

FIG. 16 illustrates the relationship between the heating time and density of blow holes having a size larger than 20 μm observed on the surface when the WC-27% NiCr sprayed coating is heated at 400° C. It should be noted that the method of observing the blow holes formed in the surface is the same as the method employed to obtain the results shown in FIG. 15. When the structure of the WC-27% NiCr sprayed coating was observed by a scanning type electronic microscope, the average particle size of the WC particles and the particle of the NiCr binder material was about 10 μm and the maximum size was 20 μm or less. Therefore, the presence of blow holes having a size of several μm does not affect the separation of the WC particles. If the size of the blow holes is larger than 20 μm, the WC particles are separated, causing the strength of the sprayed coating to deteriorate. Therefore, the blow holes larger than the particle size of 20 μm or more were measured. The term "blow holes" means blow holes having a size of 20 μm hereinafter.

As shown in FIG. 16, the number of blow holes rapidly increases if the sprayed coating is heated at 400° C. for 15 hours or longer. The change in the number of the blow holes coincides with the change in the hardness shown in FIG. 7. Thus, the change in a hardness of the sprayed coating due to heating is determined by a number ratio of the blow holes in the sprayed coating.

Figure 17:
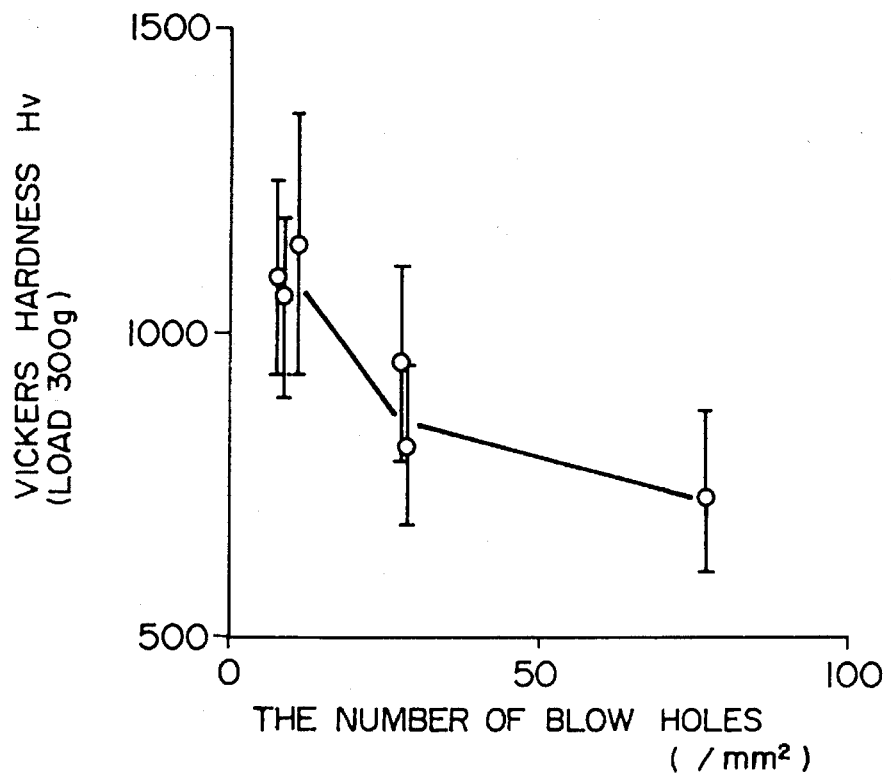
FIG. 17 is a graph which illustrates the relationship between the number ratio of blow holes in the surface of the WC-27% NiCr sprayed coating and the hardness when it is heated at 400° C.

The relationship between the number of the blow holes and the hardness obtained from the change in the hardness of the heating time and the change in the number ratio of the blow holes respectively shown in FIGS. 12 and 16 is shown in FIG. 17. If the number of the blow holes is 30 per square milimeter ($mm^2$) or lower, the hardness commences to increase, and the hardness preferable for the bearing portion of the pump is realized when the number is 15 per square milimeter ($mm^2$) or lower. Therefore, it is preferable that the sprayed coating to be applied to the bearing portion of the pump has a number of the blow holes having a size larger than 20 μm and present in the surface of 15 per square milimeter ($mm^2$) or less, preferably 10 per square milimeter ($mm^2$) or less. It is noted that the WC-12% cobalt sprayed coating and the $Cr_3C_2$-25% NiCr sprayed coating as well as attained a similar phenomenon.

Figure 18A:
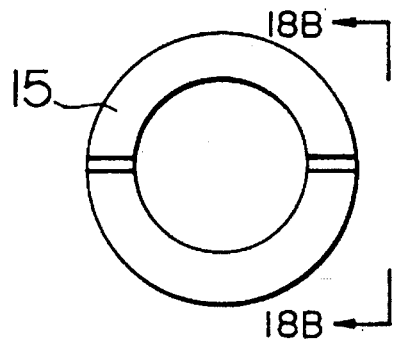
FIGS. 18A, 18B, 18C and 18D illustrate the shape of the wear test specimen and the method of sliding it.
Figure 18B:
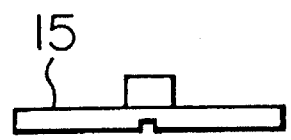
Figure 18C:
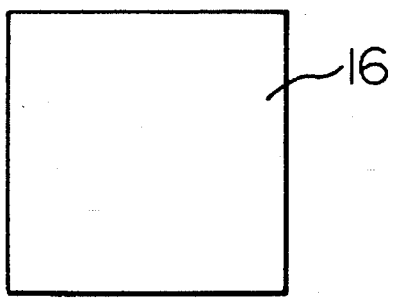
Figure 18D:
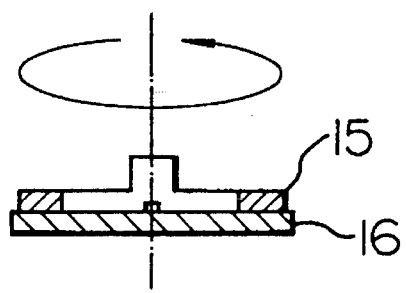

In order to evaluate the wear resistance of the bearing and the sleeve having the sprayed coating subjected to the heat treatment against water containing earth and sand, the following element test was carried out. The method of the element test and a portion of results will now be described with reference to FIGS. 18A–18D and 19. A rotation-side specimen 15 shown in FIG. 18A and a stationary-side specimen shown in FIG. 18B are dipped in water containing quartz sand and assumed to be water containing earth and sand. Then, the rotary-side specimen is rotated as shown in FIG. 18D to be slid while being applied with a predetermined surface pressure. After they are slid for a predetermined time, the abrasion losses of the two specimens were measured. The wear losses were evaluated by measuring the thickness of the rotation-side specimen 15 before and the after the test. The surface shape of the stationary-side specimen 16 before and after the test was measured by a surface roughness meter. The examining conditions are as follows: the surface pressure is 1 to 10 kg/cm$^2$, the peripheral speed is about 0.5 to 5 m/sec, and concentration of quartz sand is 0.1 to 10 wt %. The sliding test was repeated as follows: the water containing earth and sand was changed at each sliding operation covering a distance of 3.6 km in order to reduce the influence of the wear of the quartz sand; and the quartz sand was interposed between the two specimens whenever water containing earth and sand was changed in order to cause the quartz sand to be easily caught between the two specimens.

Figure 19:
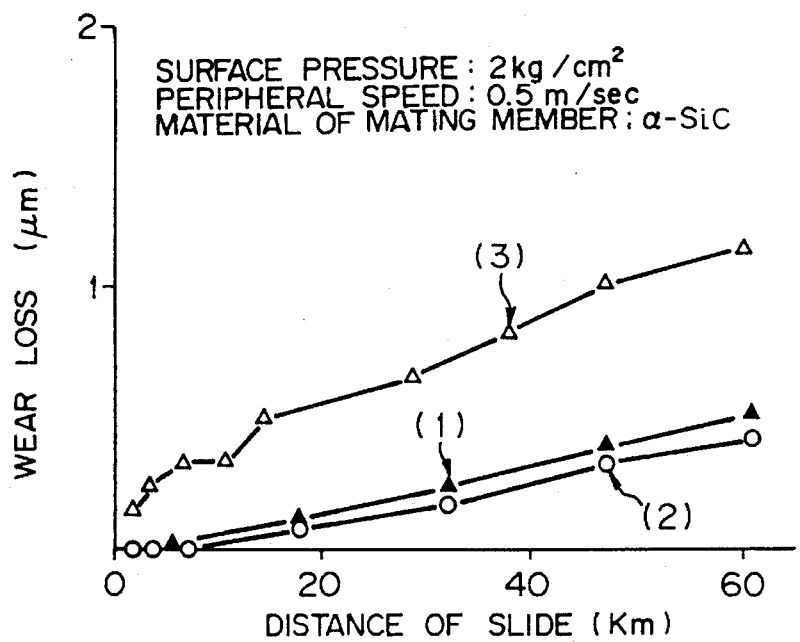
FIG. 19 illustrates the relationship between the distance of sliding and the wear loss obtained by a wearing test subjected to a WC-12% cobalt sintered article, the WC-27% NiCr sprayed coating subjected to no heat treatment and the WC-27% NiCr sprayed coating subjected to the heat treatment.

FIG. 19 shows a portion of results of the experiments of the wear resistance of the sprayed coating subjected to the heat treatment. The abscissa stands for the distance of sliding and the ordinate stands for the average wear loss of the rotational side specimen. The stationary-side specimen is α-SiC, while the rotation-side specimen is WC-27% NiCr sprayed coating having a thickness of about 100 μm. The base is made of stainless steel of JIS SUS403 subjected to heat treatments of quenching and tempering. The conditions of the heat treatment applied to the sprayed coating was determined while referring to the results shown in FIG. 12 to be 400° C. for 20 hours. As a comparative material, a WC-12% cobalt sintered article and non-treated WC-27% NiCr sprayed coating were used as the rotation-side specimens under the similar conditions. The residual test conditions are as follows: the surface pressure is 2 kg/cm$^2$, the peripheral speed is 0.5 m/s and the concentration of the quartz sand is 9 wt %.

Figure 21:
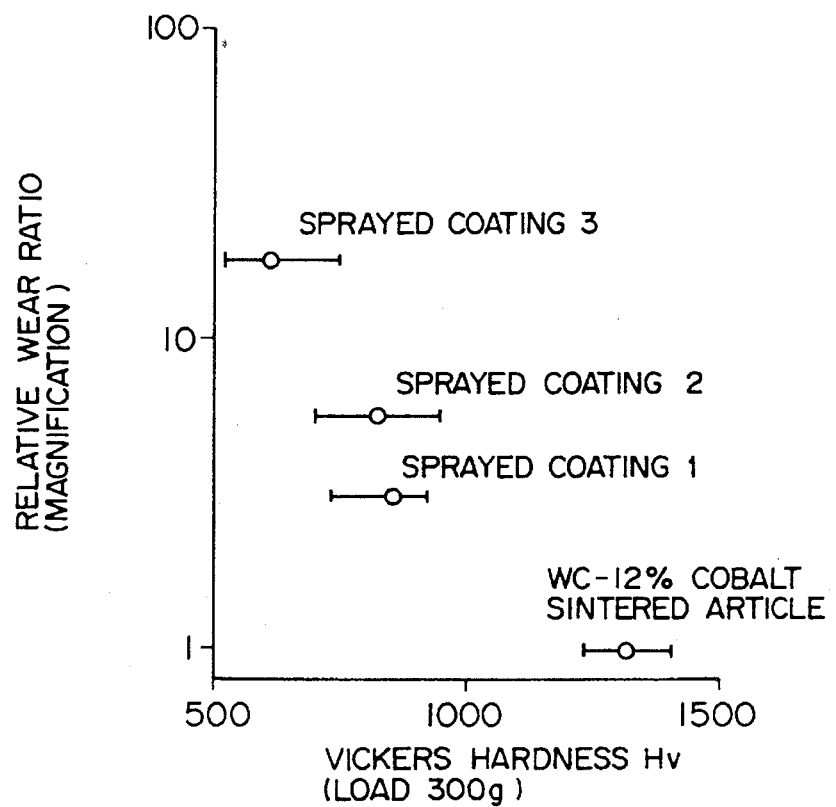
FIG. 21 is a graph which illustrates the hardness of conventional sprayed coatings and relative wear ratio against water containing earth and sand with respect to WC-12% sintered article as a reference material.

Referring to FIG. 19, a line (1) designated by -▲-shows the change in the abrasion loss of the WC-27% NiCr sprayed coating subjected to the heat treatment and applied to the bearing member according to the present invention, a line (2) designated by -o- shows the change in the wear loss of WC-12% cobalt sintered article which is the comparative material applied to the conventional bearing member, and a line (3) designated by -△- shows the change in the wear loss of the WC-27% NiCr sprayed coating which is the comparative material and to which no heat treatment is applied. The wear rate of the WC-27% NiCr sprayed coating which is not subjected to the heat treatment is about three times the wear loss of the WC-12% cobalt sintered article. On the other hand, the wear rate of the WC-27% NiCr sprayed coating is substantially the same as the wear rate of the WC-12% cobalt sintered article. That is, the heat treatment set to 400° C. for twenty hours causes the wear loss of the WC-27% NiCr sprayed coating against water containing earth and sand was reduced to one-third. It can be considered that the foregoing reduction in the abrasion loss was caused from the increase in the hardness due to the heat treatment shown in FIG. 12 to which the sprayed coating was subjected. The wear resistance of the sprayed coating subjected to the heat treatment is a reasonable value because of the relationship between the hardness of the sprayed coating and the abrasion rate shown in FIG. 21.

Although omitted from FIG. 19, an excellent wear resistance is attained from a combination of the WC-27% NiCr sprayed coating subjected to the heat treatment set to 400° C. for 20 hours and Si3N4. The Si3N4 film employed by the fixed-side specimen exhibited excellent wear resistance superior to SiC.

Also the WC-12% cobalt sprayed coating enables a similar effect to be obtained from a similar heat treatment as a result of a similar experiment. However, the WC-12% cobalt sprayed coating does not enable the hardness to be improved unlikely the WC-27% NiCr sprayed coating. Therefore, the wear resistance of the WC-12% cobalt sprayed coating is inferior to that of the WC-12% cobalt sintered article and that of the WC-27% NiCr sprayed coating subjected to the heat treatment. Furthermore, cobalt employed as the binder material is inferior to NiCr in terms of the corrosion resistance. Therefore, there is a possibility of generation of abrasion due to corrosion. Since the number of the blow holes in the surface of the aforesaid WC-12% cobalt subjected to the heat treatment decreases, use of the cobalt binder material enables the wear resistance against corrosive abrasion to be improved. However, the attained wear resistance is insufficient against drain containing salinity such as sea water. Therefore, a bearing which uses the WC-12% cobalt sprayed coating cannot be used depending upon the conditions for use.

As a result of a similar experiment, $Cr_3C_2$-25% NiCr sprayed coating enables improved wear resistance to be realized. However, the realized improvement in the wear resistance is inferior to that realized in the WC-27% NiCr sprayed coating and WC-12% cobalt sprayed coating. The reason for this is that the fact that inherent hardness of the $Cr_3C_2$-25% NiCr sprayed coating is inferior to the hardness of the WC-27% NiCr sprayed coating and that of WC-12% cobalt sprayed coating deteriorates the effect of the heat treatment.

Figure 20:
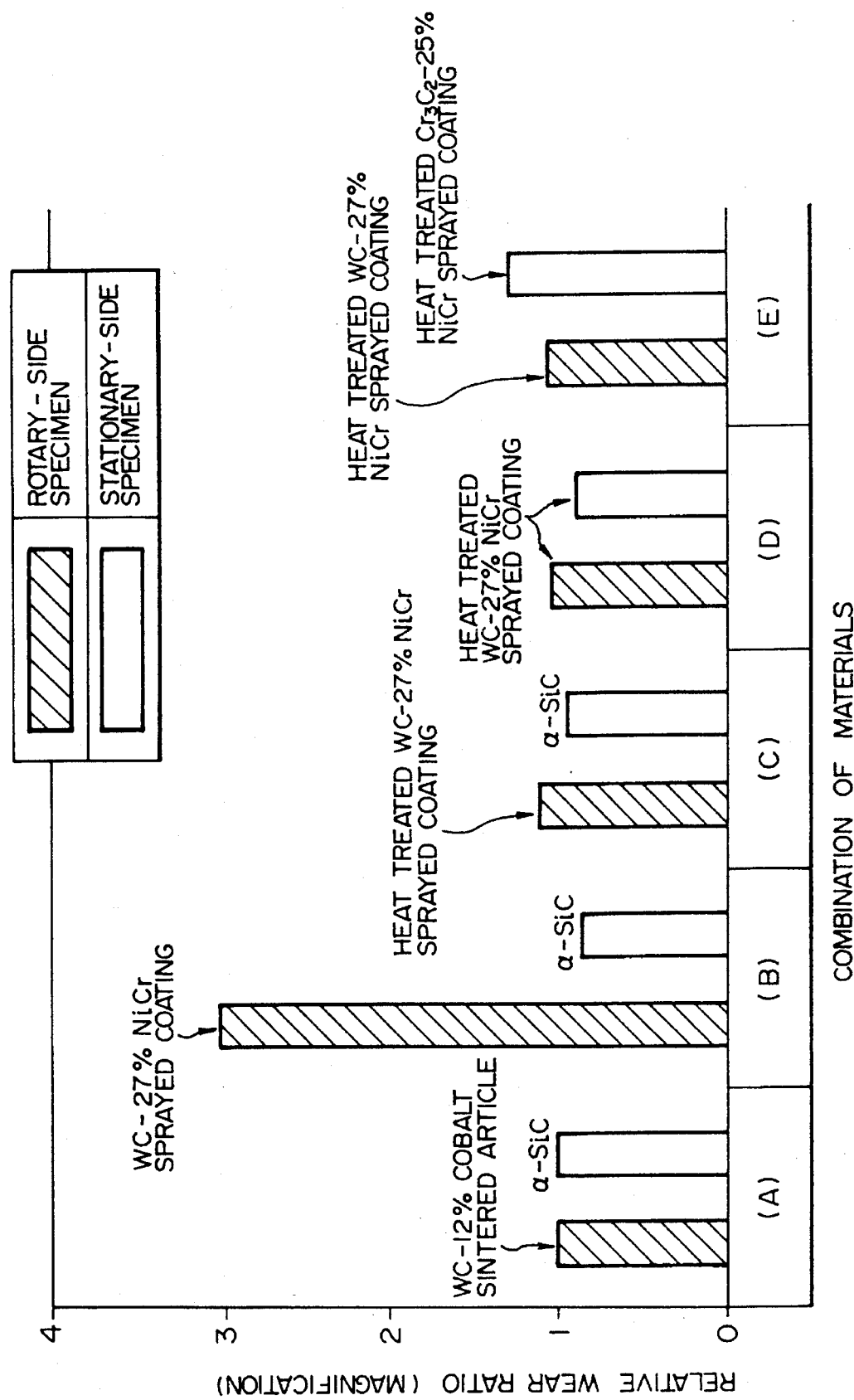
FIG. 20 is a graph which illustrates the relative wear rates of combinations of materials including the WC-27% NiCr sprayed coating subjected to the heat treatment, $Cr_3C_2$-25% NiCr subjected to the heat treatment.

FIG. 20 collectively shows the wear rates of the results shown in FIG. 19, results obtained when WC-27% NiCr sprayed coatings are used in both the stationary-side and the rotation-side specimens, and those obtained when the WC-27% NiCr sprayed coating was used as the rotation-side specimen and the $Cr_3C_2$-25% NiCr sprayed coating subjected to the heat treatment was used as the stationary-side specimen.

FIG. 20 shows the wear rates of the stationary-side and the rotation-side specimens after they were subjected to the experiment for sixty hours. The test conditions are the same as those of the experiment shown in FIG. 19. The relative wear rates shown on the axis of ordinate are values of the wear rates of specimens expressed by relative values while making the wear rate of the rotation-side and the stationary-side specimens of (A) which is the combination of WC-12% cobalt sintered article and α-SiC to be a reference value 1.0. In the bar graph, the bars each having diagonal lines entered therein represent the wear rates of the rotation-side specimens and the bars having no diagonal lines represent the wear rates of the fixed-side specimens.

The combination (A) is a combination of the WC-12% cobalt sintered article and α-SiC and is the results of a curve (2) shown in FIG. 19. Combination (B) is a result of a combination of WC-27% NiCr sprayed coating subjected to no heat treatment designated by curve (3) shown in FIG. 19 and α-SiC. Combination (C) is a result of a combination of the WC-27% NiCr sprayed coating subjected to the heat treatment which is the material of the bearing according to the present invention and designated by curve (1) shown in FIG. 19 and α-SiC. Combination (D) is a result of a combination of the WC-27% NiCr sprayed coating subjected to the heat treatment which is the material for the bearing according to the present invention and the WC-27% NiCr sprayed coating subjected to the heat treatment. Combination (E) is a result of a combination of the WC-27% NiCr sprayed coating subjected to the heat treatment and the $Cr_3C_2$-25% NiCr sprayed coating subjected to the heat treatment. It should be noted that the conditions of the heat treatment to which the each sprayed coating is subjected are as follows: 400° C. for 20 hours.

As described with reference to FIG. 19, the combination (C) enables both of the stationary-side specimen and the rotation-side specimen to have the wear resistance substantially equivalent to that attained from combination (A), that is, the combination of the WC-12% cobalt sintered article and α-SiC. Also the combination (D) having the arrangement that the WC-27% NiCr sprayed coatings subjected to the heat treatment are used in both of the stationary-side specimen and the rotation-side specimen enabled the rotation-side specimen and the stationary-side specimen to have the wear resistance substantially equivalent to that of the WC-12% cobalt sintered article.

The WC-27% NiCr sprayed coating subjected to the heat treatment for use in the stationary-side specimen exhibited excellent wear resistance superior to that of α-SiC. The hardness of α-SiC is an average value of Hv 2704 (maximum value Hv 2874 and minimum value Hv 2591) which is considerably superior to the hardness of the WC-27% NiCr sprayed coating subjected to the heat treatment. The reason why. the WC-27% NiCr sprayed coating subjected to the heat treatment exhibited the superior wear resistance to that of a-SiC in spite of the aforesaid fact lies in the difference in the ductility between the two materials, that is, the difference in the fracture toughness. The fracture toughness of α-SiC is about 3.9 (MN/m.= ¯m) which is inferior to that of the WC-27% NiCr sprayed coating, that is about 13 (MN/m.= ¯m). It can be considered that the excellent fracture toughness of the WC-27% NiCr sprayed coating subjected to the heat treatment affects the wear resistance rather than the hardness does and the foregoing excellent wear resistance is obtained. It should be noted that the fracture toughness was measured by a Vickers impression method.

The combination (E) in which the WC-27% NiCr sprayed coating subjected to the heat treatment was used as the rotation-side specimen and the $Cr_3C_2$-25% NiCr sprayed coating subjected to the heat treatment was used as the stationary-side specimen enabled the rotation-side specimen to have a similar wear rate to that realized by each of the combinations (C) and (D). However, the wear rate of the $Cr_3C_2$-25% NiCr sprayed coating subjected to the heat treatment and used as the fixed-side specimen was higher than that of α-SiC and that of the WC-27% NiCr sprayed coating subjected to the heat treatment. It can be considered that the reason for this lies in that the hardness of the $Cr_3C_2$-25% NiCr sprayed coating cannot be significantly improved even if it is subjected to the heat treatment. However, the $Cr_3C_2$-25% NiCr sprayed coating exhibited equivalent or superior wear resistance to that of the WC-27% NiCr sprayed coating if the temperature of the drain is high. It can be considered that the reason for this lies in that the hardness of the $Cr_3C_2$-25% NiCr sprayed coating does not deteriorate considerably at high temperature. Therefore, the combination of the WC-27% NiCr sprayed coating subjected to the heat treatment and the $Cr_3C_2$-25% NiCr sprayed coating subjected to the heat treatment causes a satisfactory effect to be obtained depending upon the condition for use.

If the WC-27% NiCr sprayed coating subjected to the heat treatment is used in the sleeve to be combined with a bearing made of SiC or $Si_3N_4$, excellent wear resistance and sliding characteristics can be obtained. In this case, it is preferable that SiC or Si3N4 be used in the bearing having a structure which is supported by the metallic backing member by shrinkage fit because the strength of SiC and Si3N4 is improved due to compressive stress applied thereto. If the WC-27% NiCr sprayed coating subjected to the heat treatment is used in both of the sleeve and the bearing, totally excellent wear resistance and sliding characteristics can be attained. Although the WC sprayed coating containing cobalt as the binder material as well as exhibits excellent wear resistance, it is difficult to be used because of a problem of corrosion if drain contains salinity. If the WC-27% NiCr sprayed coating and the $Cr_3C_2$-25% NiCr sprayed coating subjected to the heat treatment are used as the sleeve and the bearing, the obtained wear resistance is inferior to that obtainable from the combinations of the WC-27% NiCr sprayed coatings. However, further improved characteristics can be realized if the temperature of the drain is high. In this case, the WC-27% NiCr sprayed coating may be employed in either of the sleeve or the bearing, resulting in the similar characteristics.

Therefore, the bearing structure according to the present invention enables the contact surface of each of the sleeve and the bearing to have similar wear resistance to that realized by a structure in which WC-12% cobalt sintered alloy is used as the bearing. Furthermore, assembling facility can be improved because the weight of the sleeve and bearing can be reduced. In addition, the fact that the sleeve and the bearing reveal excellent toughness will prevent fracture due to impact, causing the reliability to be improved. Therefore, a rotational machine such as a pump and a hydraulic turbine that incorporates the bearing structure according to the present invention is attained satisfactory reliability.

Although each of the foregoing embodiments employs the high speed flame spraying method for forming the sprayed coating, an explosive spraying method, a pressure reduction plasma spraying method, a laser spraying method or a plasma spraying method may be employed while freed from particular limitation. It should be noted that it is preferable that the hardness before the heat treatment is performed is higher. It is preferable to employ the high speed flame spraying method or the explosion spraying method because a hard sprayed coating can be formed.

Although each of the foregoing embodiments employs stainless steel of JIS SUS 403 as the material for the sleeve base and the bearing base, another material which can be used in water may be employed. Furthermore, it is preferred to employ stainless steel of JIS SUS403 in place of stainless steel of JIS SUS304 because of a larger thermal coefficient of expansion if the coefficient of thermal expansion of the sprayed coating, the main component of which is WC or $Cr_3C_2$. In addition, it is preferable to employ stainless steel of JIS SUS304L or JIS SUS316L containing low carbon if the deterioration of the corrosion resistance of the stainless steel due to the heat treatment is taken into consideration.

Although each of the foregoing embodiments employs NiCr and cobalt as the binder material by contents of 12 wt %, 25 wt % and 27 wt %, the content is not limited if the characteristics required for the sprayed coating are met.

The present invention has the arrangement that the sprayed coating, the main component of which is WC or $Cr_3C_2$, is heated under a predetermined condition. Therefore, the binding strength between the WC particles or $Cr_3C_2$ particles with the binder material is enlarged. As a result, the blow holes in the sprayed coating can be reduced, causing the average of the hardness to be increased by about 50 to 60%. Therefore, the wear resistance against water containing earth and sand can be improved by three times the wear resistance before the heat treatment is performed. The thus realized characteristics are equivalent to those of the ceramics sintered article such as the WC-12% cobalt. Therefore, the sleeve and bearing formed by applying. sprayed coating on the surface of a metallic base can be used in place of the sleeve and the bearing made of WC-12% sintered article.

As a result, a bearing and a sleeve each having a large diameter can be manufactured which cannot be manufactured by using the sintered articles such as WC, SiC or $Si_3N_4$.

Furthermore, the weight of the bearing and that of the sleeve can be reduced regardless of the diameter, causing the assembling facility to be improved significantly.

Moreover, stainless steel can be used to form the base in place of the sintered articles such as WC, SiC or $Si_3N_4$ suffering from unsatisfactory toughness. Therefore, the reliability of the bearing and the sleeve can be improved. Consequently, a pump or a hydraulic turbine incorporating the bearing unit according to the present invention can be improved.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A drainage pump comprising:

a casing through which a drain flows;

a bearing;

a sleeve in sliding contact with said bearing;

a main rotary shaft supported in said casing by said bearing, said main rotary shaft including an impeller, said main rotary shaft being constructed such that at least a portion of said bearing is operated without an external water supply;

wherein a contact surface of at least one of said bearing and a contact surface of said sleeve is applied with a sprayed coating; and wherein a ratio of a number of blow holes, having a diameter not less than 20 μm, contained in a surface of said sprayed coating is not greater than 15 per square millimeter.

2. A drainage pump comprising:

a casing through which a drain flows;

a bearing;

a sleeve in sliding contact with said bearing;

a main rotary shaft supported in said casing by said bearing, said main rotary shaft including an impeller, said main rotary shaft being constructed such that at least a portion of said bearing is operated without an external water supply;

wherein a contact surface of at least one of said bearing and a contact surface of said sleeve is applied with a sprayed coating; and wherein said sprayed coating is heated to a temperature of from 300° C. to 550° C. after said sprayed coating has been applied, said sprayed coating having a hardness of at least Hv 1000.

3. A drainage pump comprising:

a casing through which a drain flows;

a bearing;

a sleeve in sliding contact with said bearing;

a main rotary shaft supported in said casing by said bearing, said main rotary shaft including an impeller, said main rotary shaft being constructed such that at least a portion of said bearing is operated without an external water supply wherein a contact surface of said sleeve is applied with a sprayed coating; and wherein a ratio $W/D^2$ of weight (kg) of said sleeve and an outer diameter D (cm) of said sleeve is 0.05 or less.

4. A drainage pump comprising:

a casing through which a drain flows;

a bearing;

a sleeve in sliding contact with said bearing;

a main rotary shaft supported in said casing by said bearing, said main rotary shaft including an impeller, said main rotary shaft being constructed such that at least a portion of said bearing is operated without an external water supply;

wherein a contact surface of at least one of said bearing and a contact surface of said sleeve is applied with a sprayed coating; and wherein a ratio of a number of blow holes, having a diameter of not less than 20 μm is not greater than 15 per square millimeter; and wherein a water reservoir tank having an opened portion in an upper portion surrounds bottom surfaces and outer surfaces of said bearing and a bearing fixing member on an outside of said main rotary shaft, said water reservoir tank being fixed to said rotary shaft.

5. A hydraulic turbine comprising:

a casing through which a fluid flows;

a bearing;

a sleeve in sliding contact with said bearing;

a main rotary shaft supported in said casing by said bearing, said main rotary shaft including a runner, and said main rotary shaft is constructed such that at least a portion of said bearing is operated while being supplied with said fluid;

wherein a contact surface of at least one of said bearing and a contact surface of said sleeve is applied with a sprayed coating; and wherein a ratio of a number of blow holes, having a diameter of not less than 20 μm, formed in the surface of said sprayed coating is 15 per square millimeter or less.

6. A hydraulic turbine comprising:

a casing through which a fluid flows;

a bearing;

a sleeve in sliding contact with said bearing;

a main rotary shaft supported in said casing by said bearing, said main rotary shaft including a runner, and said main rotary shaft being constructed such that at least a portion of said bearing is operated while being supplied with said fluid;

wherein a contact surface of one of said bearing and a contact surface of said sleeve is applied with a sprayed coating; and wherein said sprayed coating is heated at a temperature of from 300° C. to 550° C. after said sprayed coating has been applied, said sprayed coating having a hardness of at least Hv 1000.

7. A hydraulic turbine comprising:

a casing through which a fluid flows;

a bearing;

a sleeve in sliding contact with said bearing;

a main rotary shaft supported in said casing by said bearing and having a runner in a portion thereof;

wherein a contact surface of said sleeve is applied with a sprayed coating; and wherein a ratio $W/D^2$ of weight W (kg) of said sleeve and an outer diameter D (cm) of said sleeve is 0.05 or less.

8. A method of manufacturing a bearing member comprising the steps of:

applying sprayed coating, the main component of which is WC, and which contains one or more elements selected from a group consisting of nickel, chromium and cobalt as a binder material thereof, to a contact portion of a metallic bearing member;

heating said metal bearing member having said contact portion applied with said sprayed coating at from 300° C. to 550° C. for at least one hour; and performing finish machining to have a predetermined size.

9. A method of manufacturing a bearing member comprising the steps of:

applying sprayed coating, the main component of which is $Cr_3C_2$ and which contains one or more elements selected from a group consisting of nickel, chromium and cobalt as a binder material thereof, to a contact portion of a metallic bearing member;

heating said bearing member having said contact portion applied with said sprayed coating at from at least 300° C. to 550° C. for at least one hour; and performing finish machining to have a predetermined size.

10. A pump provided for draining a flowage, performing a precedent standby operation and comprising a bearing unit which is operated without an external water supply;

wherein said bearing unit includes a bearing, a bearing casing, a resilient member, a fixing member and a sleeve; said sleeve is formed by applying, to a stainless steel surface, a sprayed coating mainly composed of WC and containing one or more elements selected from a group consisting essentially of nickel, chromium and cobalt as a binder material; and wherein said bearing is fashioned of a plurality of divided ceramic sections.

11. A drain pump according to claim 1, wherein said sprayed coating is mainly composed of WC and contains one or more elements selected from a group consisting essentially of nickel, chromium and cobalt as a binder material, or mainly composed of $Cr_3C_2$ and contains nickel and chromium as a binder material, and wherein a thickness of said sprayed coating is in a range of between 100 μm to 200 μm, and a contact surface portion of at least one of said sleeve and said bearing is divided into at least two sections.

12. A drain pump according to claim 2, wherein said sprayed coating is mainly composed of WC and contains one or more elements selected from a group consisting essentially of nickel, chromium and cobalt as a binder material, or mainly composed of $Cr_3C_2$ and contains nickel and chromium as a binder material, a thickness of said sprayed coating is between 100 μm to 200 μm, and wherein a contact surface portion of at least one of said sleeve and said bearing is divided into at least two sections.

13. A drain pump according to claim 3, wherein said sprayed coating is mainly composed of WC and contains one or more elements selected from a group consisting essentially of nickel, chromium and cobalt as a binder material, or mainly composed of $Cr_3C_2$ and nickel and chromium as a binder material, a thickness of said sprayed coating is between 100 μm to 200 μm, and wherein a contact surface portion of one of said sleeve and said bearing is divided into at least two sections.

14. A drain pump according to claim 4, wherein said sprayed coating is mainly composed of WC and contains one or more elements selected from a group consisting essentially of nickel, chromium and cobalt as a binder material, or mainly composed of $Cr_3C_2$ and nickel and chromium as a binder material, a thickness of said sprayed coating is between 100 μm to 200 μm, and a contact surface portion of at least one of said sleeve and said bearing is divided into at least two sections.

15. A hydraulic turbine according to claim 5, wherein said sprayed coating is mainly composed of WC and contains one or more elements selected from a group consisting of nickel, chromium and cobalt as a binder material thereof.

16. A hydraulic turbine according to claim 6, wherein said sprayed coating is mainly composed of WC and contains one or more elements selected from a group consisting of nickel, chromium and cobalt as a binder material thereof.

17. A hydraulic turbine according to claim 7, wherein said sprayed coating is mainly composed of WC and contains one or more elements selected from a group consisting of nickel, chromium and cobalt as a binder material thereof.

18. A drainage pump according to claim 1, for in said sprayed coating is mainly composed of $Cr_3C_2$ and contains nickel and chromium as a binder material, and wherein a thickness of said sprayed coating is in a range of between 100 μm to 200 μm, and a context surface portion of at least 1 of said sleeve and said bearing is divided into at least two sections.

19. A drainage pump according to claim 2, for in said sprayed coating is mainly composed of $Cr_3C_2$ and contains nickel and chromium as a binder material, a thickness of said sprayed coating is between 100 μm to 200 μm, and for in a context surface portion of at least 1 of said sleeve and said bearing is divided into at least two sections.

20. A drainage pump according to claim 3, wherein said sprayed coating is mainly composed of $Cr_3C_2$ and nickel and chromium as a binder material, a thickness of said sprayed coating is between 100 μm to 200 μm, and for in a context surface portion of one of said sleeve and said bearing is divided into at least two sections.

21. A hydraulic turbine according to claim 5, wherein said sprayed coating is mainly composed of $Cr_3C_2$ and contains nickel and chromium as a binder material thereof.

22. A hydraulic turbine according to claim 6, wherein said sprayed coating is mainly composed of $Cr_3C_2$ and contains nickel and chromium as a binder material thereof.

23. A hydraulic turbine according to claim 7, wherein said sprayed coating is mainly composed of $Cr_3C_2$ and contains nickel and chromium as a binder material thereof.

* * * * *